(12) United States Patent
Yoshii et al.

(10) Patent No.: US 12,743,149 B2
(45) Date of Patent: Sep. 22, 2026

(54) MIXED REALITY DEVICE, PROCESSING METHOD, AND STORAGE MEDIUM

(71) Applicant: KABUSHIKI KAISHA TOSHIBA, Tokyo (JP)

(72) Inventors: Takanori Yoshii, Kawasaki Kanagawa (JP); Yusuke Aoki, Yokohama Kanagawa (JP); Kyotaro Hayashi, Yokohama Kanagawa (JP); Hiroaki Nakamura, Kawasaki Kanagawa (JP); Yoshiyuki Hirahara, Mishima Shizuoka (JP); Masamitsu Fukuda, Yokohama Kanagawa (JP); Takafumi Kozakai, Tokyo (JP); Yasuo Namioka, Nerima Toyko (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 18/827,099

(22) Filed: Sep. 6, 2024

(65) Prior Publication Data

US 2025/0123676 A1 Apr. 17, 2025

(30) Foreign Application Priority Data

Oct. 11, 2023 (JP) ................................ 2023-176209

(51) Int. Cl.
*G06F 3/01* (2006.01)
*G02B 27/01* (2006.01)
*G06T 19/00* (2011.01)

(52) U.S. Cl.
CPC ............ *G06F 3/011* (2013.01); *G02B 27/017* (2013.01); *G06F 3/012* (2013.01); *G06T 19/006* (2013.01);

(Continued)

(58) Field of Classification Search
CPC ....... G06F 3/011; G06F 3/012; G02B 27/017; G02B 2027/0178; G02B 2027/0138; G02B 2027/014; G02B 2027/0141; G06T 19/006

See application file for complete search history.

(56) References Cited

U.S. PATENT DOCUMENTS

2014/0198017 A1 7/2014 Lamb et al.
2014/0375683 A1* 12/2014 Salter ...................... G06F 3/011 345/633

(Continued)

FOREIGN PATENT DOCUMENTS

JP 2016-512626 4/2016
JP 6077010 2/2017

(Continued)

*Primary Examiner* — Adam R. Giesy
(74) *Attorney, Agent, or Firm* — Knobbe, Martens, Olson & Bear, LLP

(57) ABSTRACT

According to one embodiment, a mixed reality device is configured to display a virtual space to overlap a real space. The mixed reality device is configured to set an origin of the virtual space by using a prescribed object imaged in the real space. The mixed reality device is configured to acquire a display position of a virtual object in a three-dimensional coordinate system based on the origin. The mixed reality device is configured to determine whether or not the display position is present inside a visible region set in front of the mixed reality device. The mixed reality device is configured to display a guide indicating a direction of the display position when the display position is not present inside the visible region.

13 Claims, 25 Drawing Sheets

(52) U.S. Cl.
CPC ................ *G02B 2027/0138* (2013.01); *G02B 2027/014* (2013.01); *G02B 2027/0141* (2013.01); *G02B 2027/0178* (2013.01)

(56) References Cited

U.S. PATENT DOCUMENTS

| | | | | |
|---|---|---|---|---|
| 2016/0025981 | A1* | 1/2016 | Burns | G02B 27/0093 345/156 |
| 2023/0104917 | A1 | 4/2023 | Yamaguchi et al. | |
| 2023/0326096 | A1 | 10/2023 | Yoshii et al. | |

FOREIGN PATENT DOCUMENTS

| | | |
|---|---|---|
| JP | 6736298 | 8/2020 |
| JP | 2023-156237 A | 10/2023 |
| WO | WO 2021/176645 | 9/2021 |

* cited by examiner

200
P3
V1
V
V2
Su
350
P2
P1
100

MIXED REALITY DEVICE, PROCESSING METHOD, AND STORAGE MEDIUM

CROSS-REFERENCE TO RELATED APPLICATIONS

This application is based upon and claims the benefit of priority from Japanese Patent Application No. 2023-176209, filed on Oct. 11, 2023; the entire contents of which are incorporated herein by reference.

FIELD

Embodiments of the invention generally relate to a mixed reality device, a processing method, and a storage medium.

BACKGROUND

Conventionally, a mixed reality device is used to perform a task efficiently. The mixed reality device can display a virtual space to overlap a real space, and can provide various information to a worker. The worker can perform the task more efficiently by referring to the information displayed by the mixed reality device. Technology that can improve the convenience of the mixed reality device is desirable.

DETAILED DESCRIPTION

Figure 1:
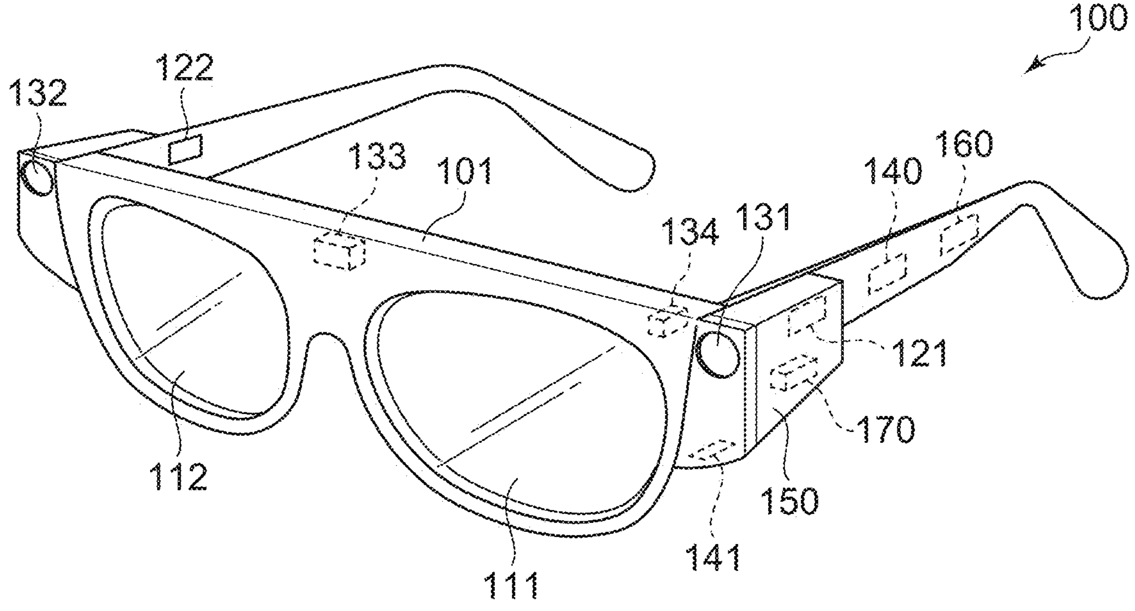
FIG. 1 is a schematic view showing a mixed reality device according to an embodiment.

According to one embodiment, a mixed reality device is configured to display a virtual space to overlap a real space. The mixed reality device is configured to set an origin of the virtual space by using a prescribed object imaged in the real space. The mixed reality device is configured to acquire a display position of a virtual object in a three-dimensional coordinate system based on the origin. The mixed reality device is configured to determine whether or not the display position is present inside a visible region set in front of the mixed reality device. The mixed reality device is configured to display a guide indicating a direction of the display position when the display position is not present inside the visible region.

Hereinafter, embodiments of the invention will be described with reference to the drawings. The drawings are schematic or conceptual, and the relationship between the thickness and width of each portion, the proportions of sizes among portions, and the like are not necessarily the same as the actual values. Even the dimensions and proportion of the same portion may be illustrated differently depending on the drawing. In the specification and drawings, components similar to those already described are marked with like reference numerals, and a detailed description is omitted as appropriate.

FIG. 1 is a schematic view showing a mixed reality device according to an embodiment.

The embodiment of the invention relates to a mixed reality device (a MR device). For example, as shown in FIG. 1, the MR device 100 according to the embodiment includes a frame 101, a lens 111, a lens 112, a projection device 121, a projection device 122, an image camera 131, a depth camera 132, a light source 133, an eye tracking camera 134, a sensor 140, a microphone 141, a processing device 150, a battery 160, and a storage device 170.

According to the illustrated example, the MR device 100 is a binocular head mounted display. Two lenses, i.e., a lens 111 and a lens 112, are fit into the frame 101. The projection device 121 and the projection device 122 respectively project information onto the lenses 111 and 112.

The projection device 121 and the projection device 122 display a recognition result of a body of a worker, a virtual object, etc., onto the lenses 111 and 112. Only one of the projection device 121 or the projection device 122 may be included, and information may be displayed on only one of the lens 111 or the lens 112.

The lens 111 and the lens 112 are light-transmissive. The worker can visually recognize reality via the lenses 111 and 112. The worker also can visually recognize information projected onto the lenses 111 and 112 by the projection devices 121 and 122. The information (the virtual space) is displayed to overlap real space by being projected by the projection devices 121 and 122.

The image camera 131 detects visible light and obtains a two-dimensional image. The depth camera 132 irradiates infrared light and obtains a depth image based on the reflected infrared light. The light source 133 irradiates light (e.g., infrared light) toward an eyeball of a wearer. The eye tracking camera 134 detects light reflected by the eyeball of the wearer. The sensor 140 is a six-axis detection sensor and is configured to detect angular velocities in three axes and accelerations in three axes. The microphone 141 accepts an audio input.

The processing device 150 controls the components of the MR device 100. For example, the processing device 150 controls the projection devices 121 and 122 to cause the projection devices 121 and 122 to display the information on the lenses 111 and 112. Hereinafter, the processing device 150 using the projection devices 121 and 122 to display information on the lenses 111 and 112 also is called simply "the processing device displaying information". The processing device 150 also detects movement of the visual field based on a detection result of the sensor 140. The processing device 150 modifies the display by the projection devices 121 and 122 according to the movement of the visual field.

The processing device 150 also is configured to perform various processing by using data obtained from the image camera 131 and the depth camera 132, data of the storage device 170, etc. For example, the processing device 150 recognizes a preset object based on the image obtained by the image camera 131. The processing device 150 recognizes the surface shape of the object based on the image obtained by the depth camera 132. The processing device 150 calculates the viewpoint and the line of sight of the eyes of the worker based on a detection result obtained by the eye tracking camera 134.

The battery 160 supplies power necessary for the operations to the components of the MR device 100. The storage device 170 stores data necessary for the processing of the processing device 150, data obtained by the processing of the processing device 150, etc. The storage device 170 may be located outside the MR device 100, and may communicate with the processing device 150.

The MR device according to the embodiment is not limited to the illustrated example, and may be a monocular head mounted display. The MR device may be an eyeglasses-type as illustrated, or may be a helmet-type.

Figure 2:
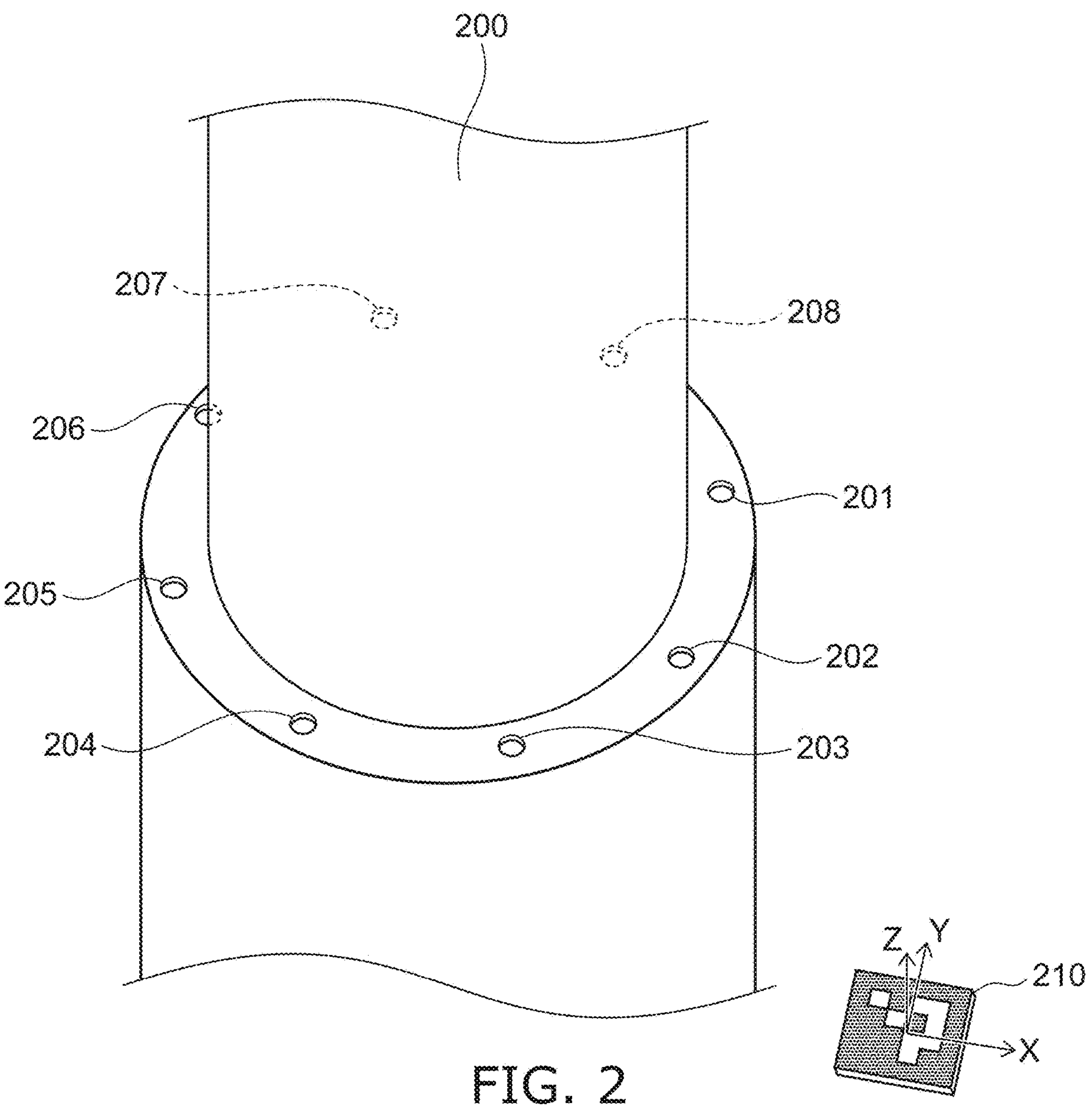
FIG. 2 is a schematic view illustrating an article that is a task object.

FIG. 2 is a schematic view illustrating an article that is a task object.

For example, the worker performs a task on an article 200 shown in FIG. 2 while wearing the MR device 100. The article 200 is a circular tubular member, and includes fastening locations 201 to 208. The worker uses a wrench and an extension bar to sequentially turn screws respectively at the fastening locations 201 to 208.

When the task is performed using the MR device 100, an origin of a virtual space is set using a prescribed object. A three-dimensional coordinate system of the virtual space is defined by setting the origin. In the example shown in FIG. 2, a marker 210 is located proximate to the task object. The marker 210 is an AR marker. As described below, the marker 210 is provided for setting the origin of the three-dimensional coordinate system. Instead of the AR marker, a one-dimensional code (a barcode), a two-dimensional code (QR code (registered trademark)), etc., may be used as the marker 210. Or, instead of a marker, the origin may be indicated by a hand (a hand gesture) of the worker. The processing device 150 sets the origin of the three-dimensional coordinate system by using multiple points indicated by the hand gesture.

The object for the setting is arbitrary as long as the origin of the three-dimensional coordinate system can be set. Herein, an example is described in which the origin is set using the marker 210.

When starting the task, the image camera 131 and the depth camera 132 image the marker 210. The processing device 150 recognizes the marker 210 based on the imaged image. The processing device 150 sets the origin of the virtual space by referencing the position and orientation of the marker 210. By setting the origin referenced to a prescribed object present in real space, virtual objects that correspond to objects in real space are displayed.

The processing device 150 calculates the position of the MR device 100. As an example, the processing device 150 uses a spatial mapping function to calculate the position and direction of the MR device 100. In the MR device 100, the depth camera 132 measures the distances to objects around the MR device 100. Surface information of the objects in the surrounding area is obtained from the measurement result of the depth camera 132. The surface information includes the positions and directions of the surfaces of the objects. For example, the surface of each object is represented by multiple meshes; and the position and direction of each mesh are calculated. Based on the surface information, the processing device 150 calculates the relative position and direction of the MR device 100 with respect to the surfaces of the objects in the surrounding area. When the marker 210 is recognized, the positions of the surfaces also are represented using the three-dimensional coordinate system having the marker 210 as the origin. The position and direction of the MR device 100 in the three-dimensional coordinate system is calculated based on the positional relationship between the MR device 100 and the surfaces of the objects. The spatial mapping is repeatedly performed at a prescribed interval.

Figure 3:
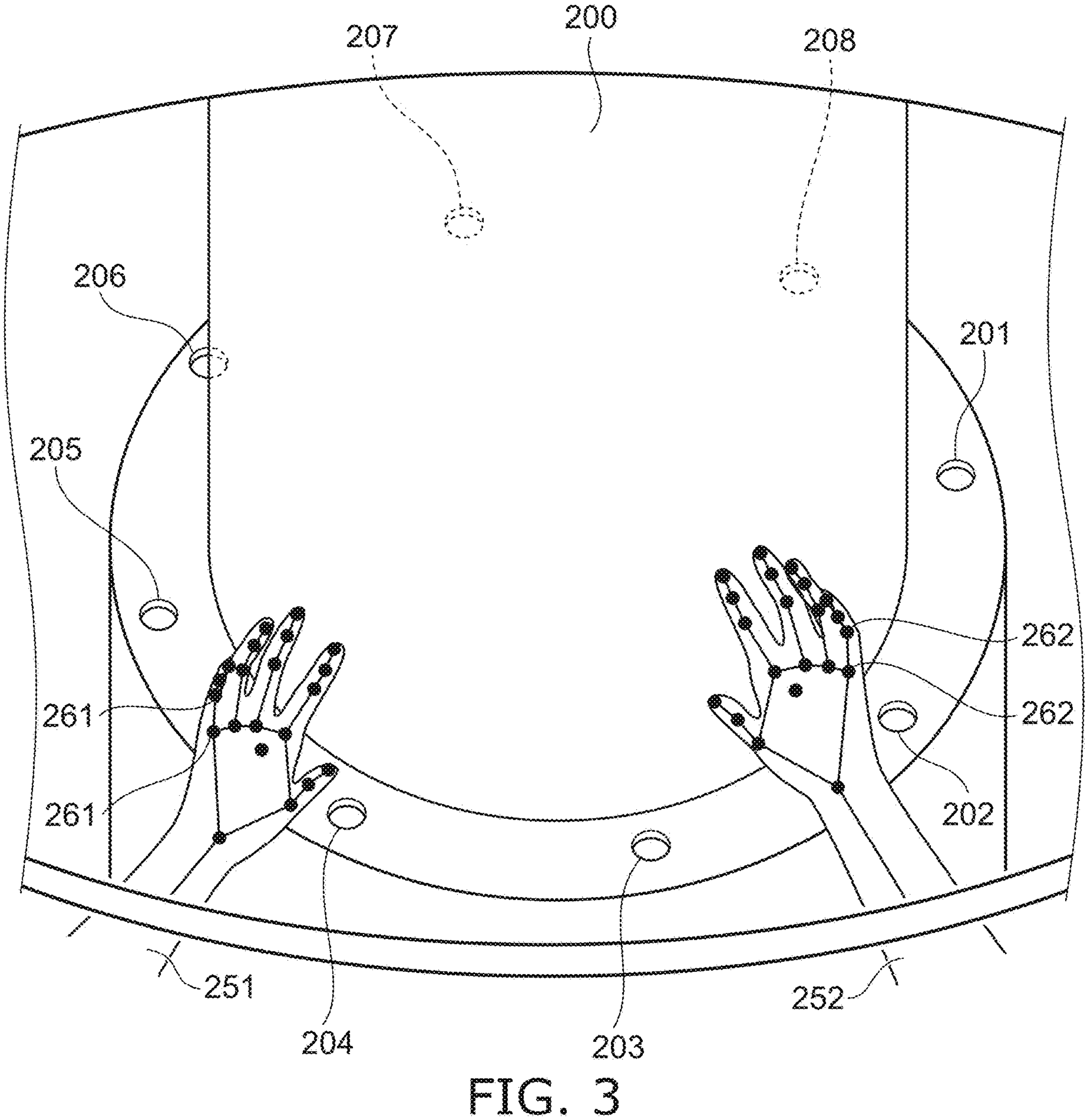
FIG. 3 is a schematic view showing an output example of the mixed reality device according to the embodiment.

FIG. 3 is a schematic view showing an output example of the mixed reality device according to the embodiment.

In the task, the image camera 131 and the depth camera 132 image the article 200, a left hand 251 of the worker, and a right hand 252 of the worker. The processing device 150 uses hand tracking to recognize the left and right hands 251 and 252 based on the imaged image. The processing device 150 may cause the projection devices 121 and 122 to display the recognition result on the lenses 111 and 112. Hereinafter, the processing device using the projection device to display information on the lens also is called simply "processing device displaying information".

For example, as shown in FIG. 3, the processing device 150 displays the recognition result of the left hand 251 and the recognition result of the right hand 252 to overlap the hands in real space. According to the illustrated example, multiple virtual objects 261 and multiple virtual objects 262 are displayed as the recognition results of the left and right hands 251 and 252. The multiple virtual objects 261 respectively indicate multiple joints of the left hand 251. The multiple virtual objects 262 respectively indicate multiple joints of the right hand 252. Instead of joints, virtual objects (meshes) that represent the surface shape of the left hand 251 and the surface shape of the right hand 252 may be displayed.

When the left hand 251 and the right hand 252 are recognized, the processing device 150 measures the positions of the hands. Specifically, each hand includes multiple joints such as a DIP joint, a PIP joint, an MP joint, a CM joint, etc. The position of any of these joints is used as the position of the hand. The centroid position of multiple joints may be used as the position of the hand. Or, the center position of the entire hand may be used as the position of the hand.

Figure 4:
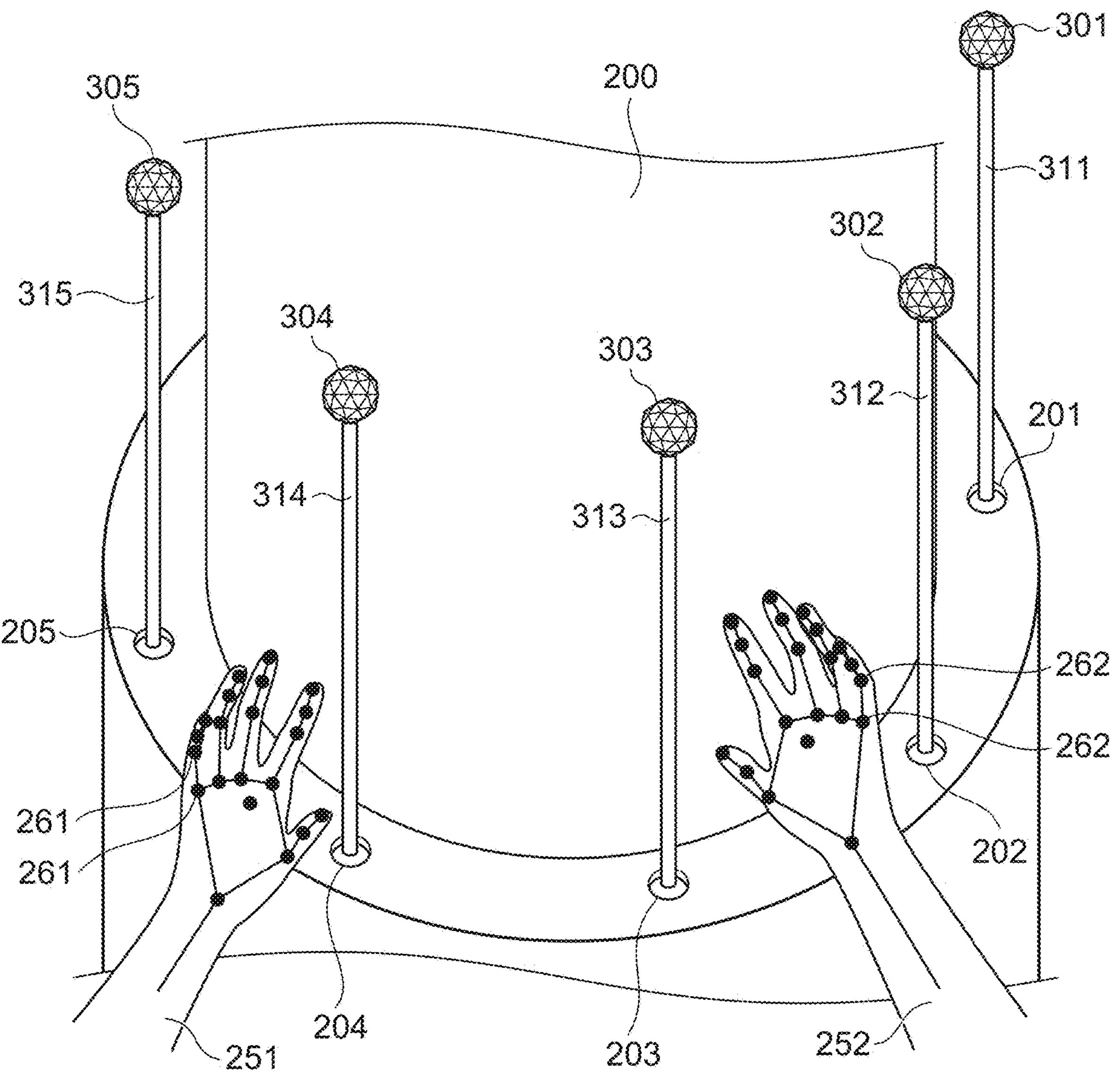
FIG. 4 is a schematic view showing an output example of the mixed reality device according to the embodiment.

FIG. 4 is a schematic view showing an output example of the mixed reality device according to the embodiment.

As shown in FIG. 4, the processing device 150 displays virtual objects 301 to 305 and virtual objects 311 to 315. The virtual objects 311 to 315 are displayed respectively between the fastening locations 201 to 205 and the virtual objects 301 to 305. The virtual objects 311 to 315 respectively show which of the fastening locations correspond to the virtual objects 301 to 305.

According to the illustrated example, the virtual objects 301 to 305 are spherical, and the virtual objects 311 to 315 are rod-shaped. The shapes of the objects are not limited to the example as long as the worker can visually recognize the virtual objects. For example, the virtual objects 301 to 305 may be cubic; and the virtual objects 311 to 315 may be linear. Virtual objects similar to the virtual objects 301 to 305 and the virtual objects 311 to 315 also are displayed for the fastening locations 206 to 208 not shown in FIG. 4.

Figure 5:
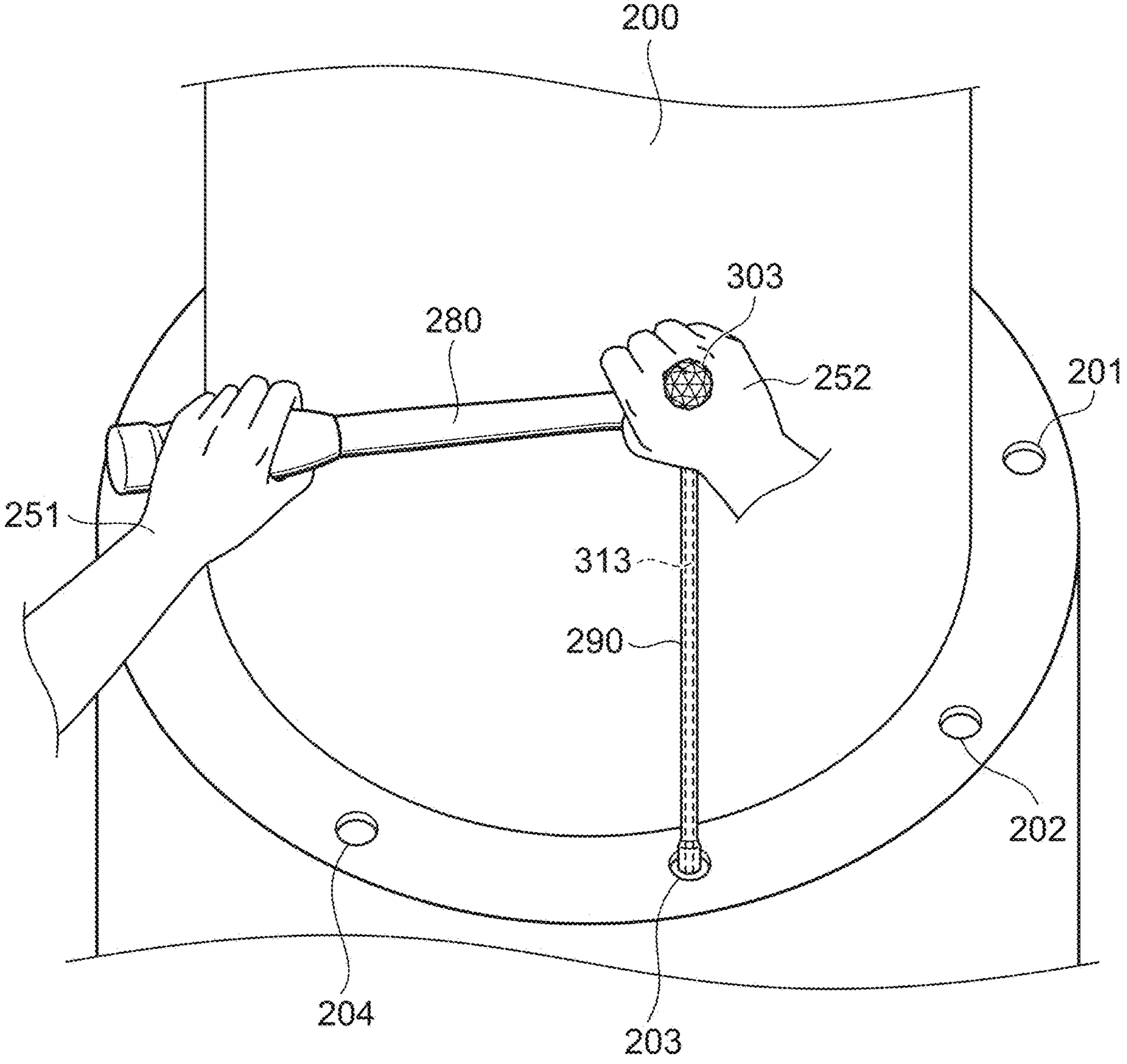
FIG. 5 is a schematic view illustrating a task.

FIG. 5 is a schematic view illustrating a task.

For example, as shown in FIG. 5, a wrench 280 and an extension bar 290 are used to turn a screw at a fastening location. As an example, when tightening a screw in the fastening location 203, the worker places a screw in the screw hole of the fastening location 203. The worker causes one end of the extension bar 290 to engage the screw. The worker causes the head of the wrench 280 to engage the other end of the extension bar 290. The worker presses the head of the wrench 280 with one hand, and grips the grip of the wrench 280 with the other hand. By turning the wrench 280, the screw is tightened at the fastening location 203 via the extension bar 290.

At this time, the worker disposes the extension bar 290 so that the extension bar 290 approaches or contacts the virtual object 313. Also, the worker grips the head of the wrench 280 so that the hand contacts the virtual object 303. By displaying the virtual object, the worker can easily ascertain the positions at which the tool and the hand are to be located when turning the screw at the fastening location 203. The work efficiency can be increased thereby.

The virtual object is displayed at a preset position in the three-dimensional coordinate system based on the marker 210. The position of the fastening location in real space may be preregistered, and the virtual object may be displayed referenced to the position of the fastening location. Specifically, in the example shown in FIG. 5, the position of the fastening location 203, the length of the extension bar 290, etc., are preregistered. The virtual object 313 is displayed between the position of the fastening location 203 and a position separated from the fastening location 203 by the length of the extension bar 290. The virtual object 303 is displayed at a position separated from the fastening location 203 by the length of the extension bar 290. As a result, the virtual objects 303 and 313 are displayed to correspond to the fastening location 203.

Figure 6:
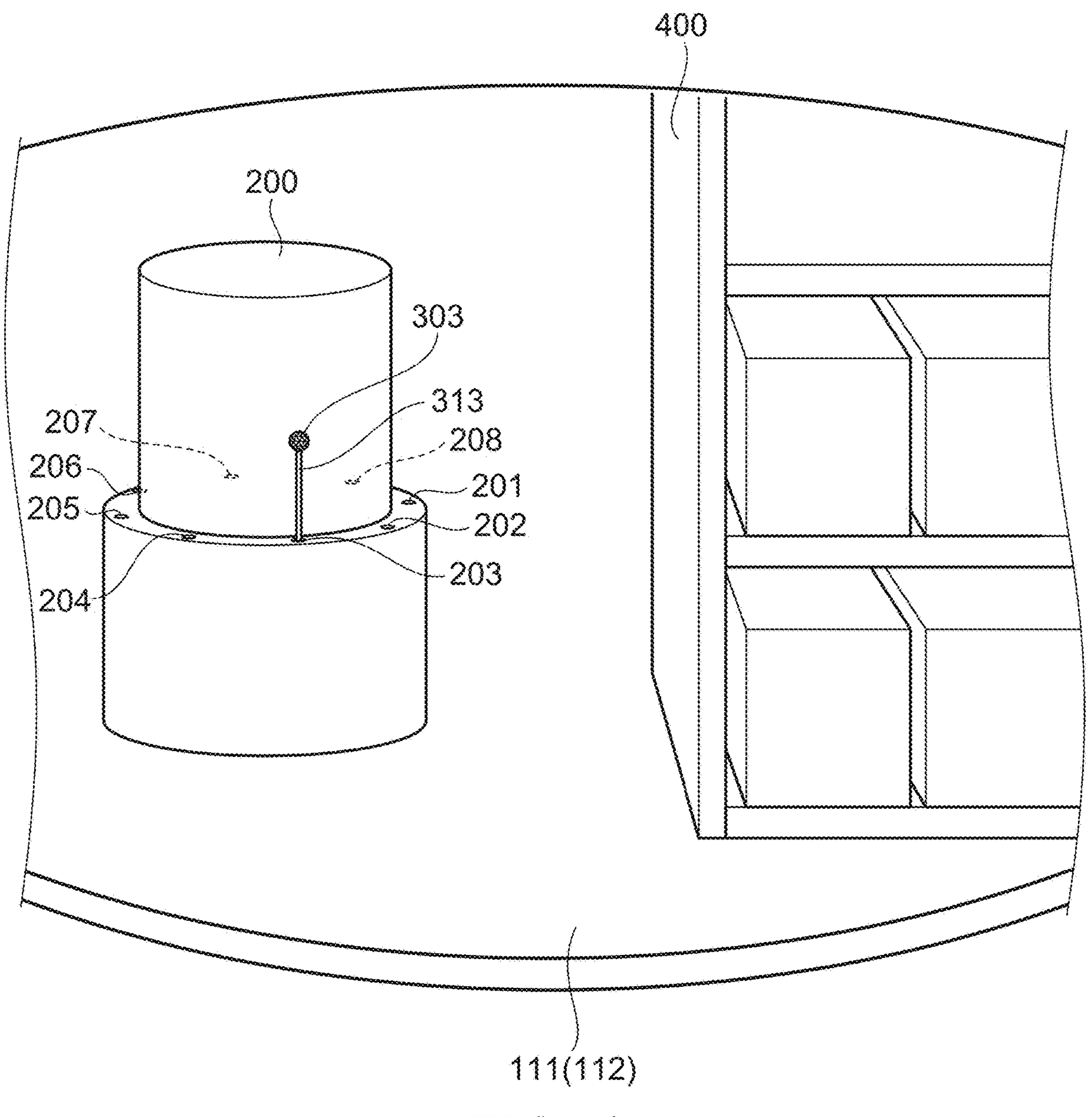
FIG. 6 is a schematic view showing a visual field of a worker.
Figure 7:
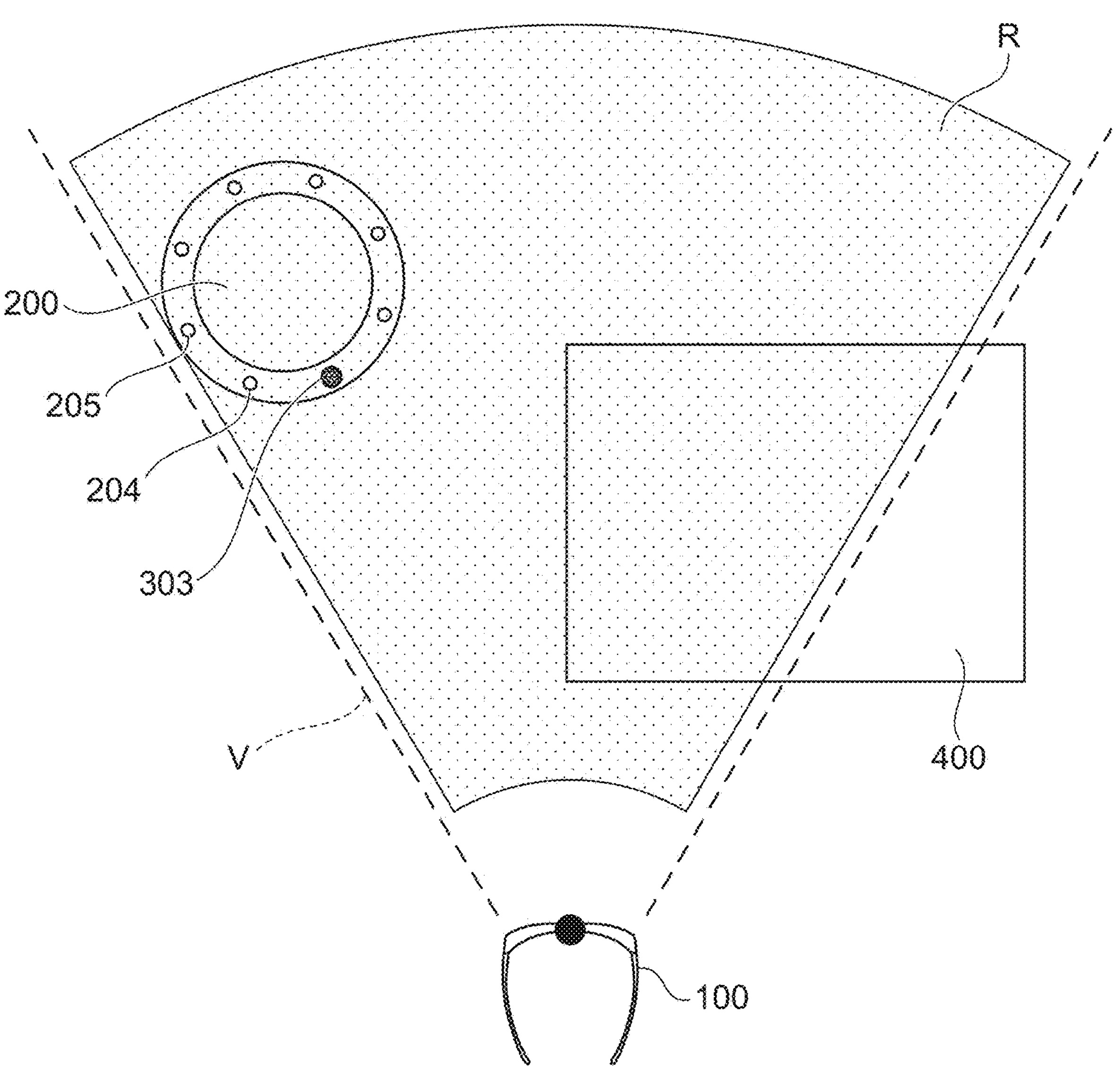
FIG. 7 is a schematic plan view showing the visual field of the worker.
Figure 8:
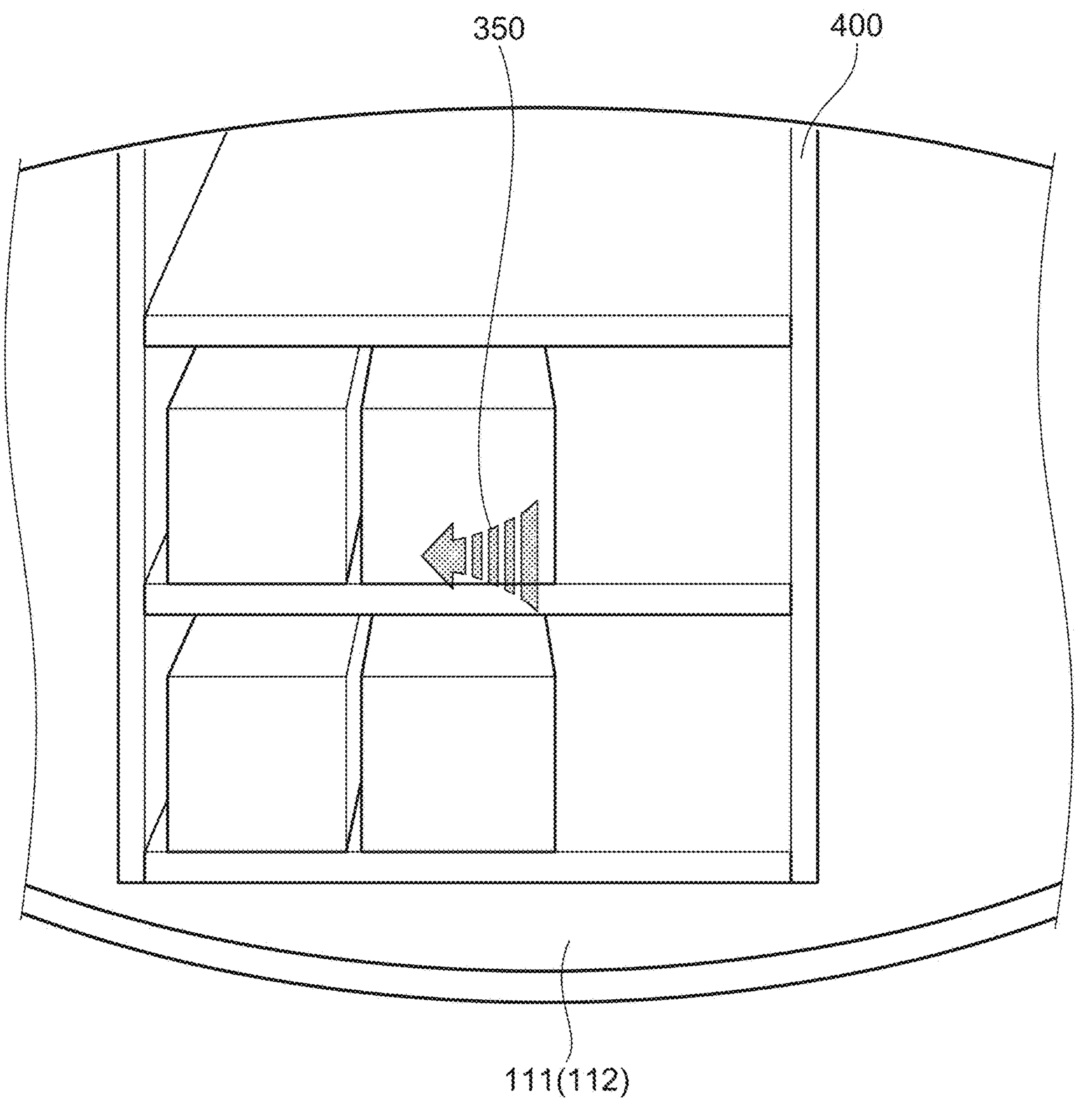
FIG. 8 is a schematic view showing the visual field of the worker.
Figure 9:
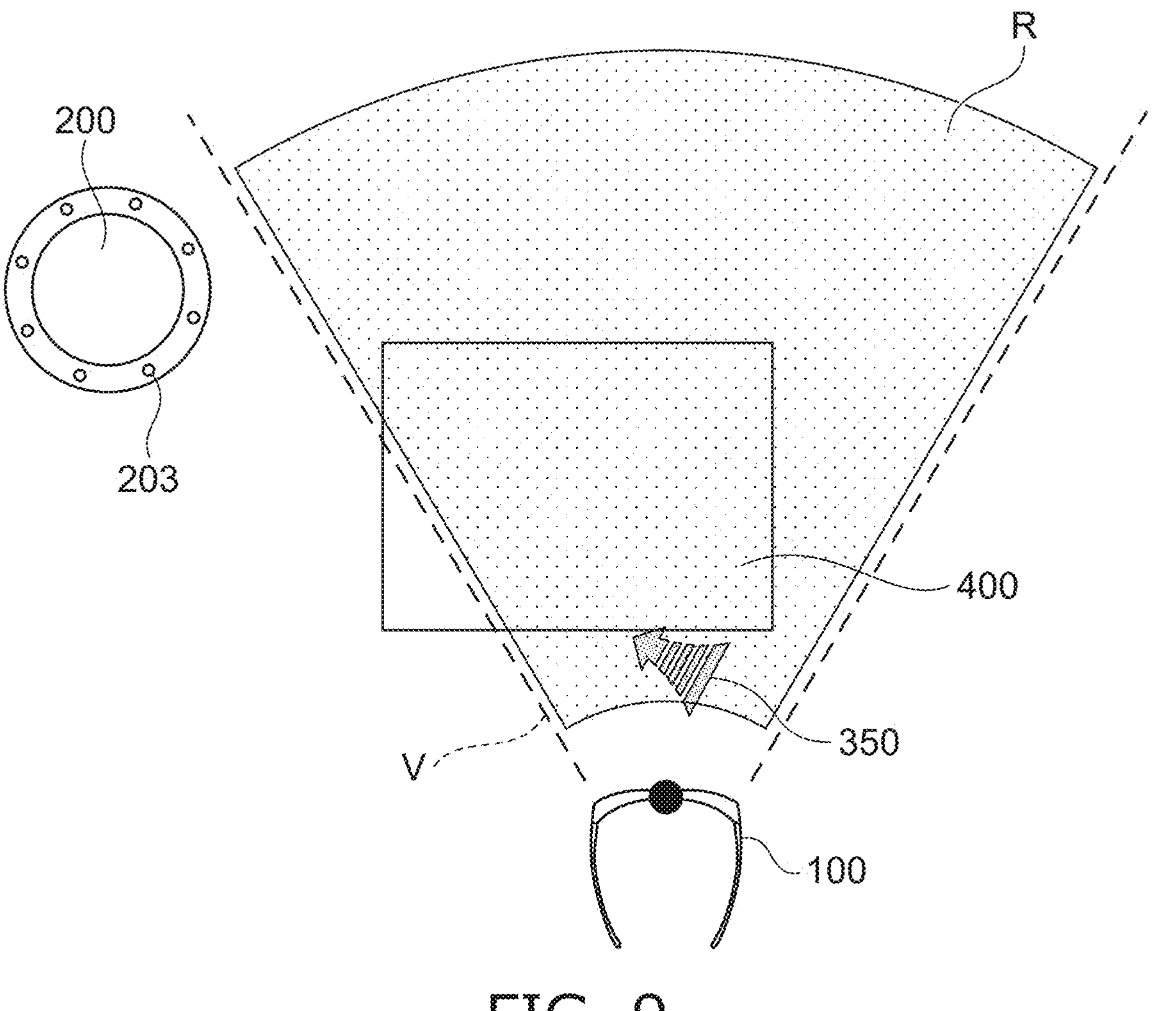
FIG. 9 is a schematic plan view showing the visual field of the worker.

FIGS. 6 and 8 are schematic views showing visual fields of the worker. FIGS. 7 and 9 are schematic plan views showing the visual fields of the worker.

In the state shown in FIGS. 6 and 7, the article 200 and a rack 400 are present inside a visual field V of the worker. According to the illustrated example, the processing device 150 displays the virtual objects 303 and 313 at the fastening location 203. Virtual objects may be displayed respectively at the fastening locations as shown in FIG. 4. The worker can visually recognize the virtual objects 303 and 313, and can ascertain that the task can be performed on the fastening location 203.

In the state shown in FIGS. 8 and 9, the article 200 is outside the visual field V of the worker. In such a case, the virtual objects 303 and 313 are not displayed inside the visual field V of the worker. The processing device 150 displays a guide 350 indicating the display positions of the virtual objects 303 and 313. The display positions of the virtual objects 303 and 313 enter the visual field V when the worker moves or changes the worker's orientation by following the guide 350. As a result, the virtual objects 303 and 313 are displayed, and the worker can visually recognize the virtual objects 303 and 313. The display of the guide 350 disappears when the virtual objects 303 and 313 are displayed.

According to the illustrated example, the guide 350 is an arrow. The guide 350 may be represented by something other than an arrow. For example, a virtual object may be displayed at the side where the virtual object is present when viewed from the worker. The virtual object may be displayed to flow from the front of the worker toward the display position of the virtual object.

The display of the guide 350 is based on the determination result of the processing device 150. Specifically, as shown in FIGS. 7 and 9, the processing device 150 sets a visible region R in front of the MR device 100. The visible region R is at least a portion of the range visible to the worker when the worker mounts the MR device 100 in the normal manner. When the display position of the virtual object is acquired, the processing device 150 determines whether or not the display position is present inside the visible region R. The processing device 150 displays the guide 350 when the display position of the virtual object is not present inside the visible region R. The processing device 150 does not display the guide 350 when the display position is present inside the visible region R.

The visible region is set to a predetermined range with respect to a reference position and a reference direction. The position of the MR device 100 is used as the reference position. The reference direction is parallel to the front surface of the MR device 100. As described above, the position and direction of the MR device 100 are calculated by spatial mapping. Or, the processing device 150 may calculate the position and direction of the viewpoint based on the position of the MR device 100 and the detection result of the eye tracking camera 134. In such a case, the processing device 150 may use the position of the viewpoint as the reference position, and may use the direction of the viewpoint as the reference direction. An example will now be described in which the visible region is set by using the position and direction of the MR device 100 as a reference.

As an example, the visible region is set to a range of 15 cm to 1 m in front of the reference position. Also, the visible region is set to a range of 43 to 120 degrees vertically and laterally with respect to the reference direction. More favorably, the visible region is set to a range of 50 to 70 degrees vertically and laterally with respect to the reference direction so that the visible region is set to only a range to which the worker can easily pay attention. The size of the visible region is appropriately set according to the visual field of the wearer that wears the MR device 100.

The guide is displayed at a preset position with respect to the reference position and the reference direction. Specifically, a position separated a prescribed distance from the reference position in the reference direction is calculated as the display position of the guide. As an example, the prescribed distance is set to about 50 cm. After the display position of the guide is calculated, the processing device 150 determines whether or not the display position of the virtual object is present inside the visible region. When the display position of the virtual object is not present inside the visible region, the processing device 150 displays the guide at the calculated display position. The guide is displayed to point in a direction from the display position of the guide toward the display position of the virtual object.

Figure 10:
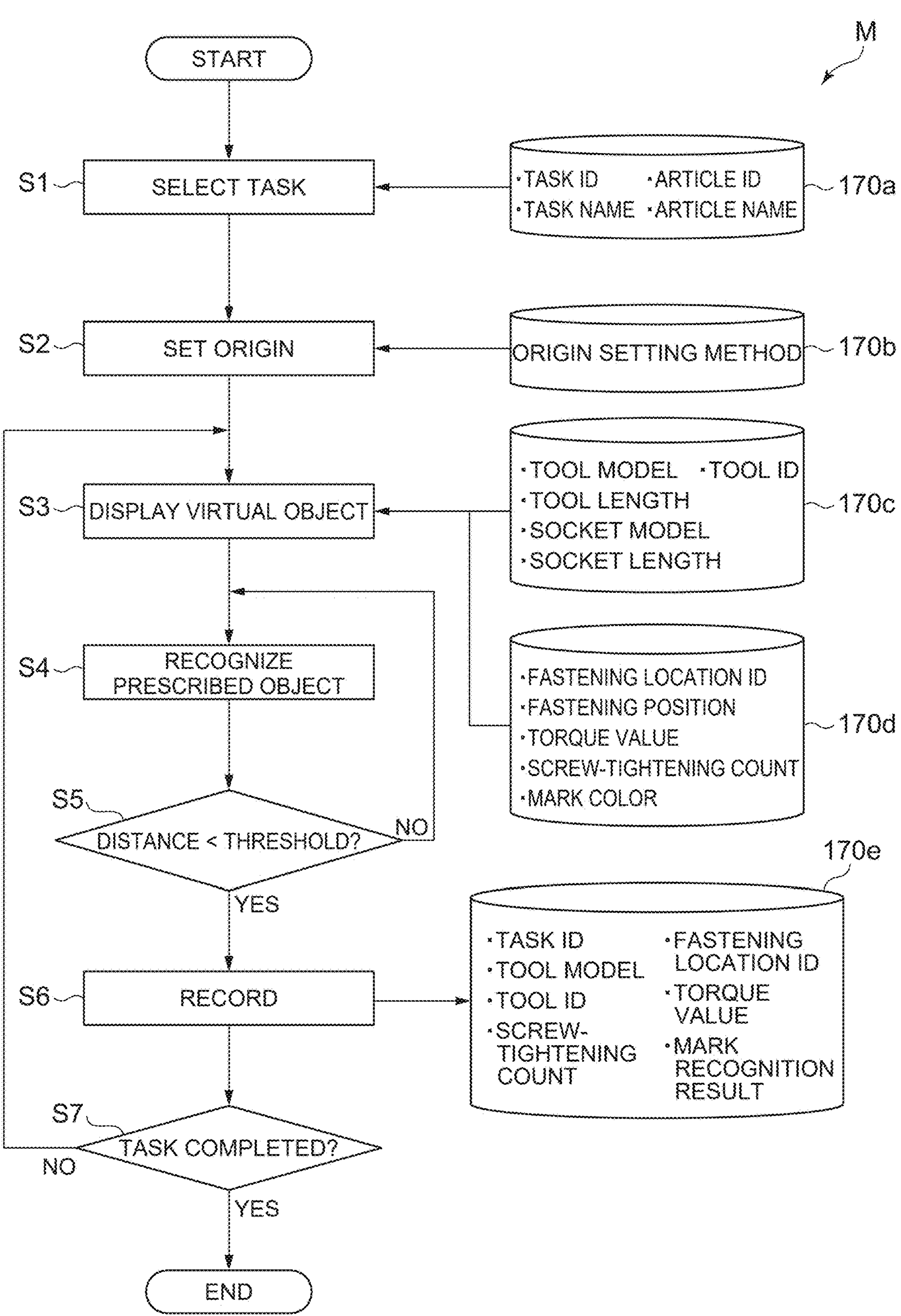
FIG. 10 is a flowchart showing a processing method according to the embodiment.

FIG. 10 is a flowchart showing a processing method according to the embodiment.

Before performing the processing method M shown in FIG. 10, task master data 170*a*, origin master data 170*b*, tool master data 170*c*, and fastening location master data 170*d* are prepared. Each set of master data is stored in the storage device 170.

First, the task to be performed is selected (step S1). The task ID, the task name, the article ID, and the article name are registered in the task master data 170*a*. The task is designated by the task ID, the task name, the ID of the article on which the task is performed, the name of the article, etc. The processing device 150 accepts the selection of the task. For example, the task to be performed is selected by the worker. The task to be performed may be selected by a higher-level system; and the processing device 150 may accept the selection. The processing device 150 may determine the task to be performed based on the data obtained from the image camera 131 or other sensors. The processing device 150 selects the task based on the determination result.

Then, the image camera 131 images the marker 210. The processing device 150 sets the origin of the three-dimensional coordinate system by using the position and orientation of the marker 210 as a reference (step S2). At this time, the processing device 150 refers to the origin master data 170*b*. The origin master data 170*b* stores the setting method of the origin for each task. The processing device 150 acquires the setting method of the origin for the selected task and sets the origin according to the setting method.

After setting the origin, the processing device 150 displays the virtual object (step S3). When displaying the virtual object, the tool master data 170*c* and the fastening location master data 170*d* are referred to as appropriate.

The tool master data 170*c* stores the ID of the tool to be used, the model of the tool, the length of the tool, the model of the socket, the length of the socket, etc., for each task. The model of the tool indicates the classification of the tool by structure, exterior shape, performance, etc. The length of the tool is the length from the rotation center to the grip when the tool is used for screw-tightening. The model of the socket indicates the classification of the socket by structure or exterior shape. The length of the socket is the length of the socket in the direction connecting the tool and the screw when tightening the screw. The processing device 150 acquires, from the tool master data 170*c*, the data of the tool to be used in the task selected in step S1. When an extension bar is used, the model, the length, etc., of the extension bar also are stored in the tool master data 170*c*. The processing device 150 also acquires the data related to the extension bar from the tool master data 170*c*.

The ID of the fastening location, the position of the fastening location, the necessary torque value, and the screw-tightening count for each fastening location are stored in the fastening location master data 170*d*. The fastening position is the position at which the fastening location is present, and is designated by the position of the three-dimensional coordinate system set in step S2. The screw-tightening count is the number of times that the screw must be tightened for each fastening location. When the screw is to be marked after tightening, the color of the mark also is registered.

The processing device 150 recognizes a prescribed object based on the image that is imaged by the image camera 131 (step S4). "Prescribed object" is an object determined to contact the virtual object. The processing device 150 calculates the position of the prescribed object and determines whether or not the distance between the object and the virtual object is less than a threshold (step S5). For example, the prescribed object is determined to contact the virtual object when the distance is less than the threshold.

When the distance is not less than the threshold, step S4 is re-performed. When the distance is less than the threshold, the processing device 150 estimates that the task is being performed at the location corresponding to the virtual object.

The processing device 150 records the task related to the estimated location and stores the task in history data 170*e* (step S6). For example, a torque value detected by the tool is associated with the ID of the task and the ID of the estimated location. As illustrated, the processing device 150 also may associate the model and ID of the tool used, the screw-tightening count, and the recognition result of the mark with the ID of the fastening location. The mark is recognized by the processing device 150 based on the image that is imaged by the image camera 131. The processing device 150 extracts an aggregate of pixels of the mark color from the image and counts the number of pixels in the aggregate. When the number of pixels is greater than a preset threshold, a mark is determined to be present.

The display of the virtual object disappears when the task is recorded. The processing device 150 determines whether or not the task is completed (step S7). When the task is not completed, step S3 is re-performed.

The task master data 170*a*, the origin master data 170*b*, the tool master data 170*c*, the fastening location master data 170*d*, and the history data 170*e* may be stored in the storage device 170, and may be stored in a server in a computer or on a network configured to communicate with the MR device 100.

Figure 11:
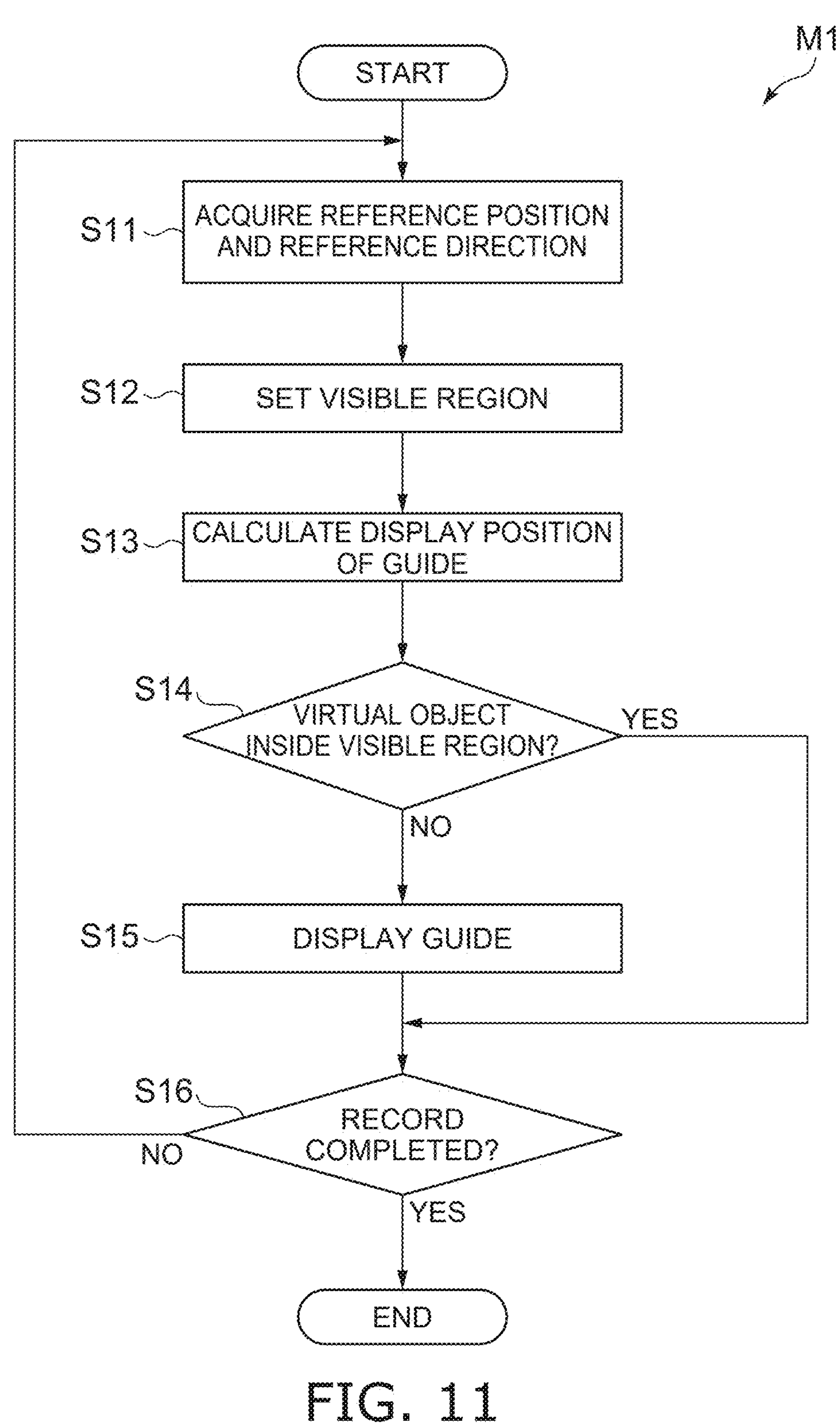
FIG. 11 is a flowchart showing a display method of a guide.

FIG. 11 is a flowchart showing a display method of the guide.

The display method M1 shown in FIG. 11 is performed after step S3 shown in FIG. 10. For example, the display method M1 is repeated until step S6 is performed.

First, the processing device 150 acquires the reference position and the reference direction (step S11). When the position and direction of the MR device 100 are used as the reference position and the reference direction, the data of the position and direction are acquired from the calculation result of spatial mapping. The processing device 150 sets the visible region based on the reference position and the reference direction (step S12). The processing device 150 calculates the display position of the guide based on the reference position and the reference direction (step S13). The processing device 150 determines whether or not the display position of the virtual object is inside the visible region (step S14). When the display position of the virtual object is outside the visible region, the processing device 150 displays a guide at the display position calculated in step S13 (step S15). When the display position of the virtual object is inside the visible region, or after step S15 is performed, the processing device 150 determines whether or not step S6 shown in FIG. 10 is completed (step S16). When step S6 is not completed, step S11 is re-performed. In such a case, the processing device 150 does not display the guide when the display position of the virtual object is determined to be inside the visible region in the following step S14.

Advantages of the embodiment will now be described.

The MR device can provide various information to the wearer. For example, when used in a work site, the worker can efficiently perform the task because the virtual object is displayed as shown in FIG. 4 or FIG. 5. On the other hand, when the virtual object is not present in the visual field, the wearer moves and/or changes the orientation of the wearer to search for the virtual object. At this time, because the wearer concentrates on searching for the virtual object, the attention of the wearer tends to be distracted from objects in the surrounding area. As a result, there is a possibility that the wearer may not notice an object in the surrounding area and may contact the object when searching for the virtual object. Also, because the task does not proceed while searching for the virtual object, the work efficiency also is reduced.

For this problem, according to the MR device 100 according to the embodiment, after the display position of the virtual object is acquired, the processing device 150 determines whether or not the virtual object is present inside the visible region. The processing device 150 displays the guide indicating the display position of the virtual object when the virtual object is not present inside the visible region. The wearer can easily ascertain the direction of the virtual object by the guide being displayed. Therefore, the time and effort of the wearer to search for the virtual object can be reduced. As a result, the likelihood of the wearer contacting objects in the surrounding area while searching for the virtual object can be reduced. In the task, the virtual object can be found more quickly, and the work efficiency can be increased. According to the embodiment of the invention, the convenience of the mixed reality device can be improved.

The processing device 150 may generate an environment map of the environment in the surrounding area of the MR device 100. As described above, the surface information of the objects in the surrounding area of the MR device 100 is obtained by spatial mapping. The processing device 150 refers to a database in which the surface information is stored. The processing device 150 determines whether or not the obtained surface information is already stored in the database. When the surface information is not yet stored in the database, the processing device 150 stores the obtained surface information in the database. The environment map of the environment in the surrounding area of the MR device 100 is generated thereby.

The processing device 150 may utilize the surface information to display the guide. For example, after the display position of the guide is calculated, the processing device 150 determines whether or not a surface of an object is present between the guide and the virtual object. When a surface is present between the guide and the virtual object, the processing device 150 uses the guide to indicate a direction in which a surface is not present.

Figures 12A, 12B:
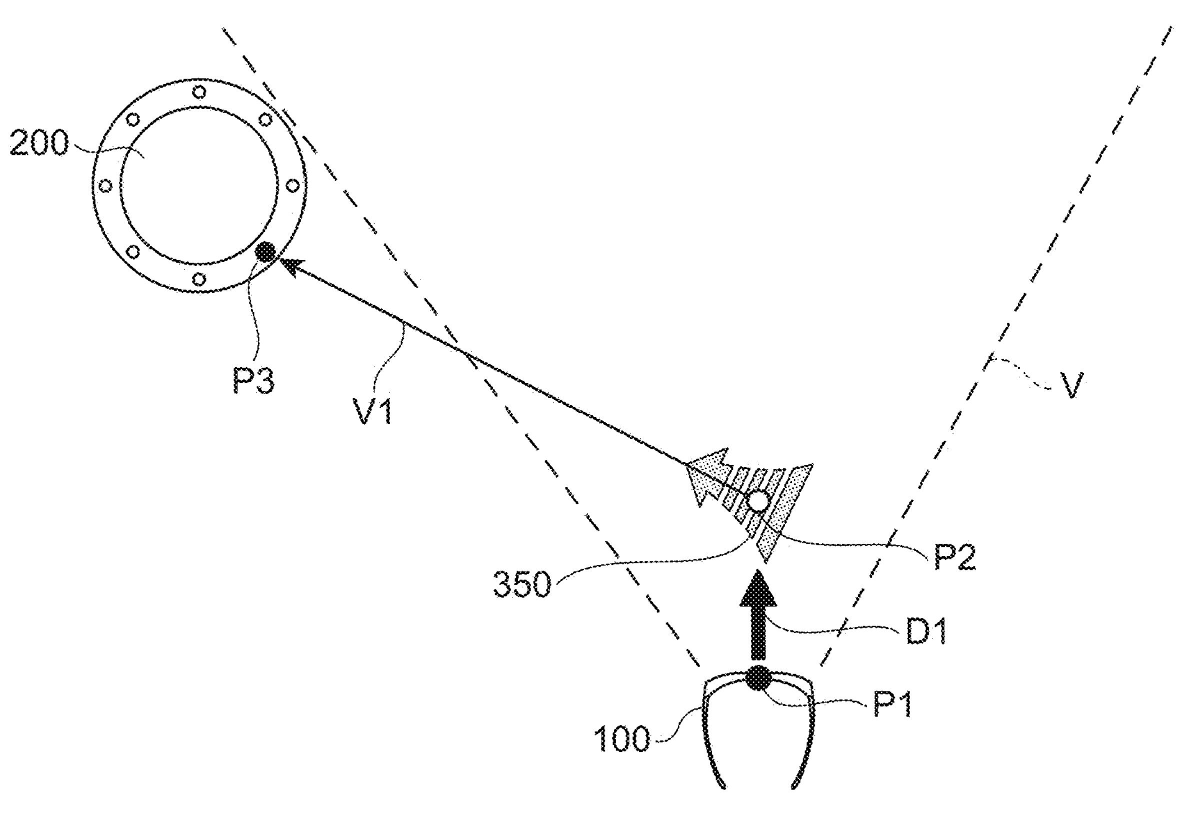
FIGS. 12A and 12B are schematic views showing output examples of the MR device according to the embodiment.
Figure 13:
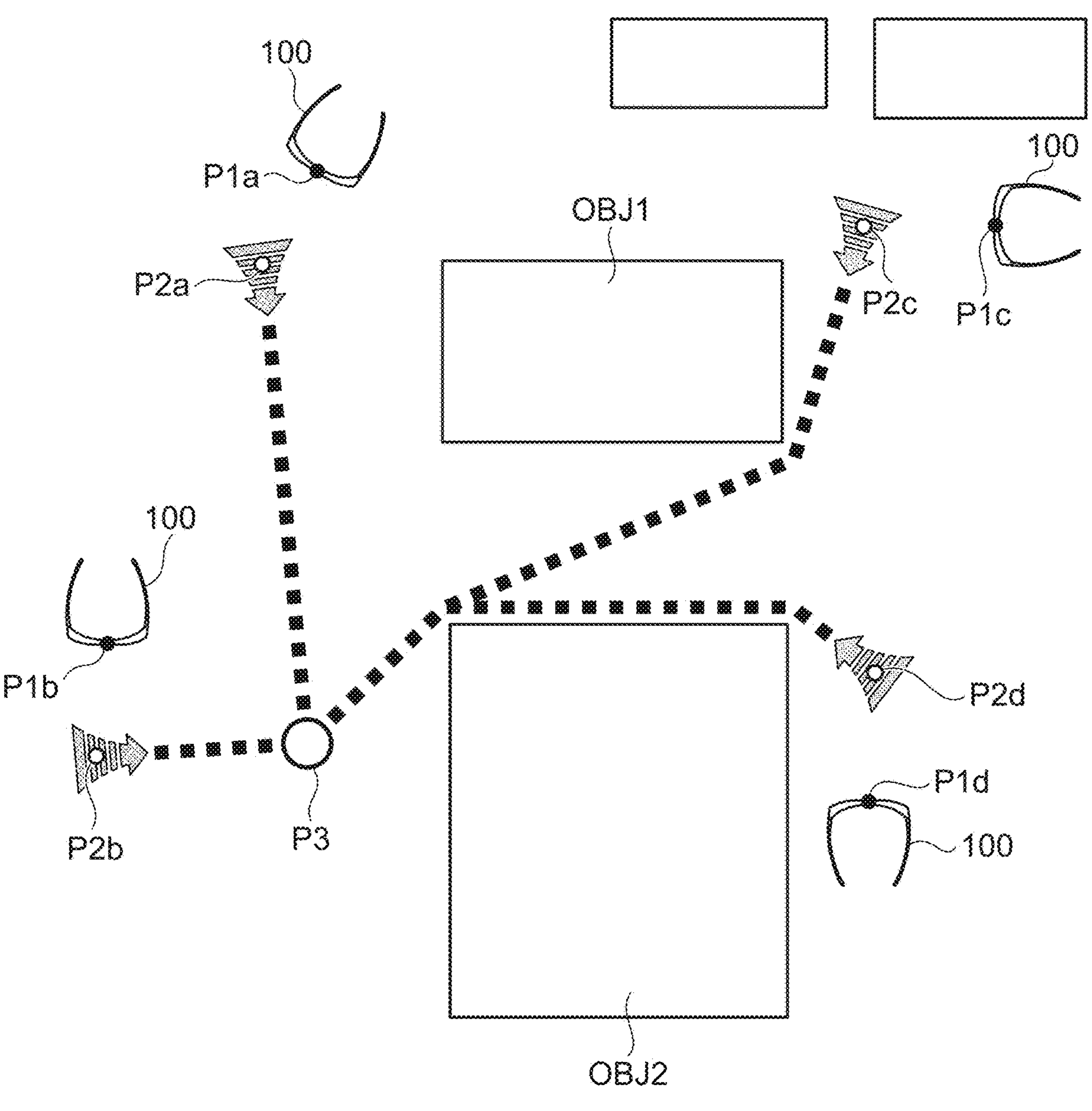
FIG. 13 is a schematic view showing an output example of the MR device according to the embodiment.

FIGS. 12A, 12B, and 13 are schematic views showing output examples of the MR device according to the embodiment.

As shown in FIG. 12A, the processing device 150 calculates a reference position P1 and a reference direction D1. The processing device 150 calculates a display position P2 of the guide based on the reference position P1 and the reference direction D1. The processing device 150 calculates a vector V1 from the display position P2 to a display position P3 of the virtual object. The processing device 150 determines whether or not the vector V1 crosses a recognized surface. In the example shown in FIG. 12A, a surface is not present between the display position P2 and the display position P3. The processing device 150 displays the guide 350 indicating a direction parallel to the vector V1.

On the other hand, in the example shown in FIG. 12B, the vector V1 crosses a surface Su of an object. In such a case, the processing device 150 searches for a vector V2 that does not cross the surface Su and has a small angle between the vector V1 and the vector V2. The processing device 150 displays the guide 350 indicating a direction parallel to the vector V2. As a result, the likelihood of the wearer contacting the object when the wearer moves by following the guide 350 can be reduced. The safety of the wearer can be improved.

In the example shown in FIG. 13, when the MR device 100 is present at a position P1*a*, the display position of the guide is determined to be a position P2*a*. The display position P3 of the virtual object is not included in the visible region. A surface is not present between the position P2*a* of the guide and the display position P3 of the virtual object. Therefore, the guide indicates the direction from the position P2*a* toward the display position P3. When the MR device 100 is present at a position P1*b*, the display position of the guide is determined to be a position P2*b*. The display position P3 is not included in the visible region. A surface is not present between the position P2*b* of the guide and the display position P3. Therefore, the guide indicates the direction from the position P2*b* toward the display position P3.

When the MR device 100 is present at a position P1*c*, the display position of the guide is determined to be a position P2*c*. The display position P3 of the virtual object is not included in the visible region. A surface of an object OBJ1 is present in real space between the position P2*c* of the guide and the display position P3 of the virtual object. In such a case, the guide indicates a direction toward the display position P3 while avoiding the surface of the object OBJ1. For example, the guides are displayed to indicate the paths illustrated by the broken lines in FIG. 13.

When the MR device 100 is present at a position P1*d*, the display position of the guide is determined to be a position P2*d*. The display position P3 of the virtual object is not included in the visible region. A surface of an object OBJ2 is present between the position P2*d* of the guide and the display position P3 of the virtual object. In such a case, the guide indicates a direction toward the display position P3 while avoiding the surface of the object OBJ2.

The object OBJ2 cannot be viewed from the MR device 100 when the MR device 100 is present at the position P1*c* and faces the object OBJ1. Accordingly, the MR device 100 cannot acquire the surface information of the object OBJ2 by spatial mapping. When, however, the surface information of the object OBJ2 is registered in the environment map, the MR device 100 can use the registered surface information to calculate the path from the position P1*c* to the display position P3. When the surface information of the object OBJ2 is not registered in the environment map, the path to the display position P3 is recalculated at the timing of acquiring the surface information of the object OBJ2 by the MR device 100 moving according to the guide.

Figure 14:
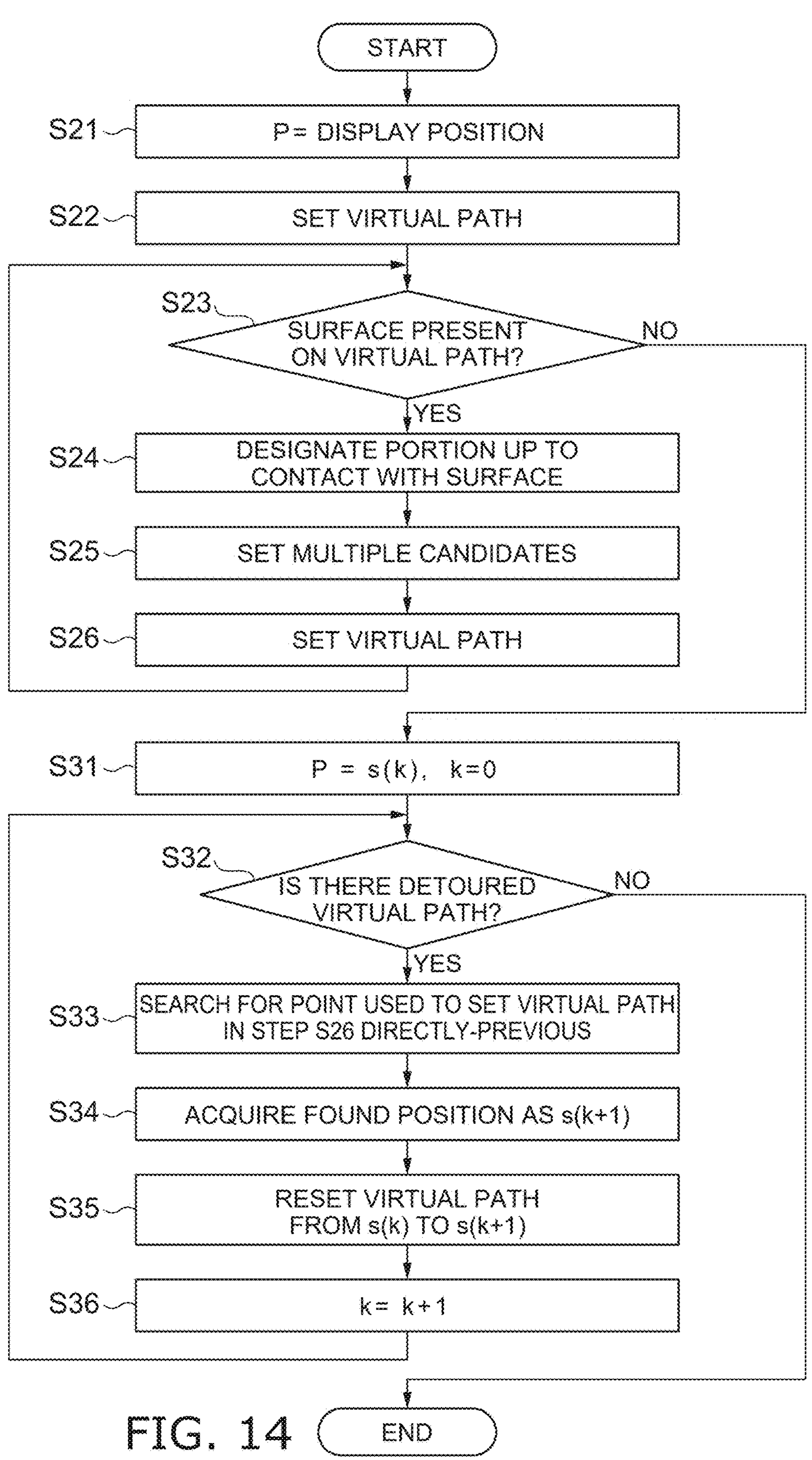
FIG. 14 is a flowchart showing a calculation method of a path.

FIG. 14 is a flowchart showing a calculation method of the path. FIGS. 15A to 18B are schematic views for describing the calculation method of the path.

When the display position of the guide is not included in the visible region, the processing device 150 performs the calculation method shown in FIG. 14. As a result, the path from the display position of the guide to the display position of the virtual object is calculated. The guide is displayed to indicate the path.

Figure 15A:
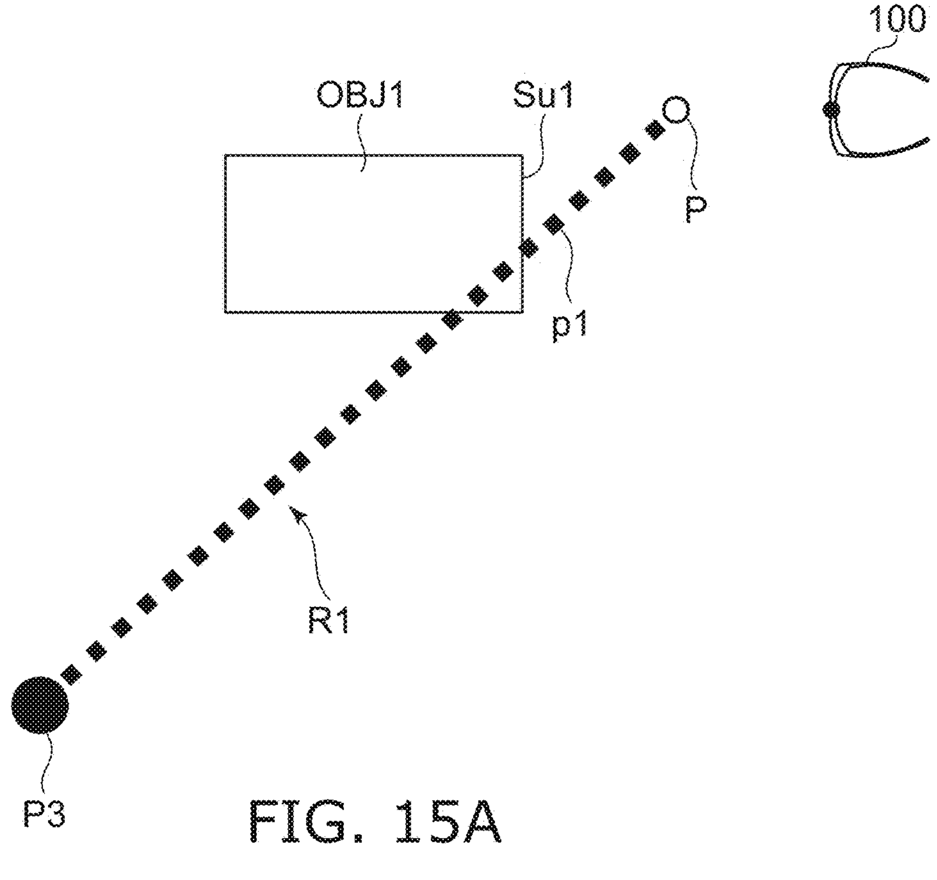
FIGS. 15A and 15B are schematic views for describing the calculation method of the path.

First, the processing device 150 acquires a display position P of the guide (step S21). The processing device 150 sets the shortest virtual path connecting the display position P of the guide to the display position of the virtual object (step S22). For example, as shown in FIG. 15A, a linear virtual path R1 is set to connect the display position P and the display position P3. The processing device 150 determines whether or not a surface recognized by spatial mapping is present on the set virtual path (step S23).

Figure 15B:
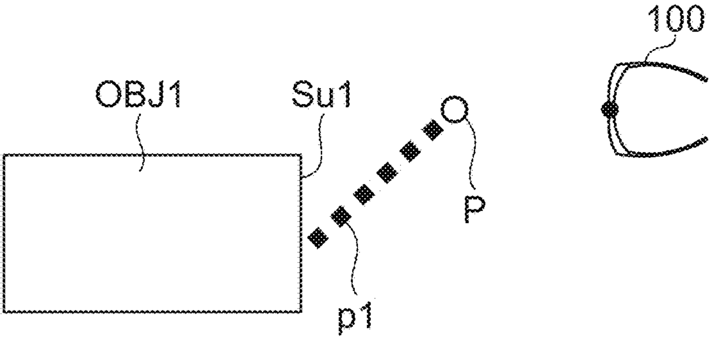
Figure 15B:

In the example shown in FIG. 15A, a surface Su1 of the object OBJ1 is present on the virtual path R1. When the surface is determined to be present, the processing device 150 designates the point of the virtual path from the display position P toward the display position of the virtual object directly before contact with the surface. For example, as shown in FIG. 15A, a point p1 is designated. The processing device 150 designates a portion of the virtual path up to the contact with the surface (step S24). In other words, the portion between the display position P and the position p1 is designated. As shown in FIG. 15B, the processing device 150 leaves only the portion of the virtual path R1 that does not contact the surface, and deletes the portion between the display position P3 and the point contacting the surface.

Figure 16A:
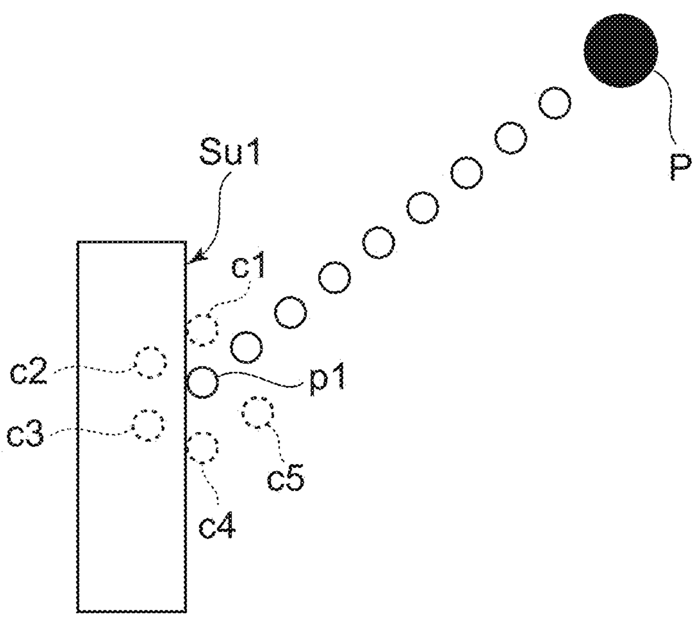
FIGS. 16A and 16B are schematic views for describing the calculation method of the path.
Figure 16B:
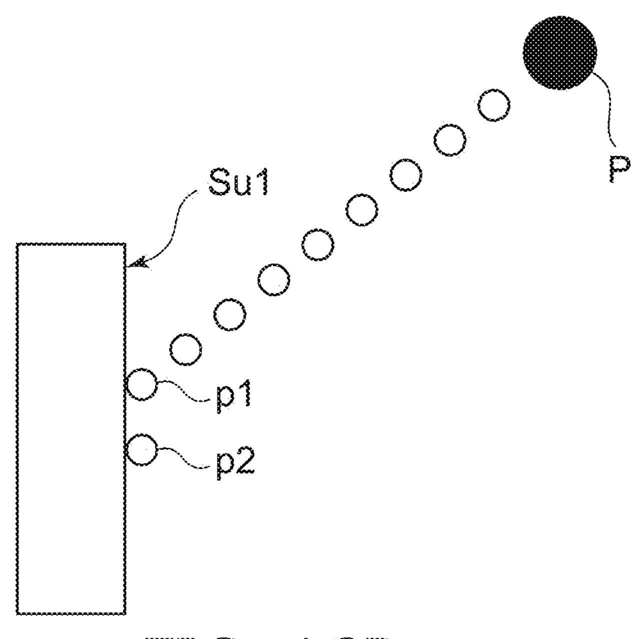
Figure 17A:
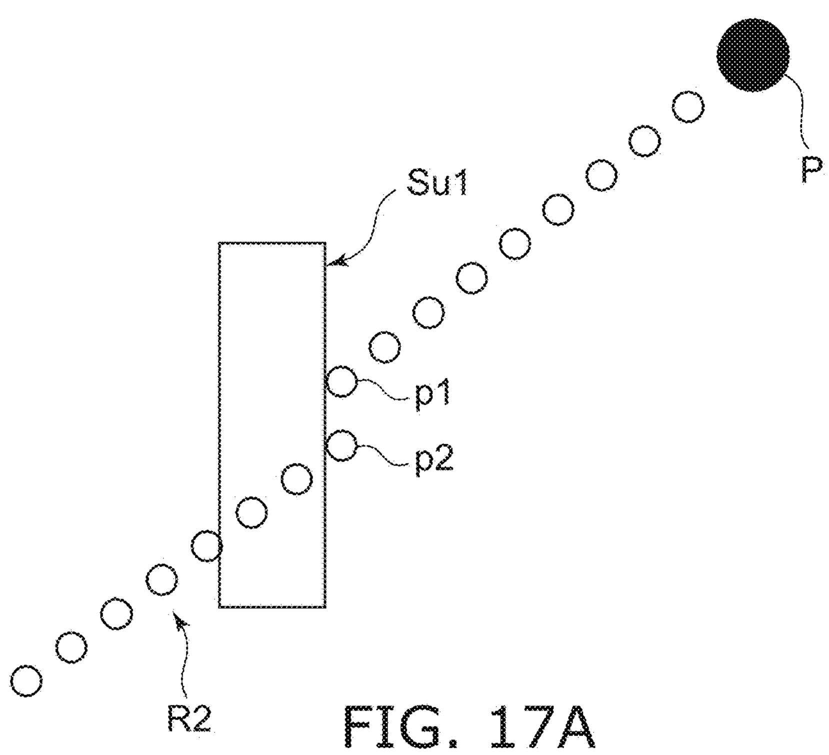
FIGS. 17A and 17B are schematic views for describing the calculation method of the path.

The processing device 150 sets multiple candidates of via-points of the virtual path around the point directly before contact by using the point directly before contact as a starting point (step S25). For example, as shown in FIG. 16A, multiple candidates c1 to c5 are set around the point p1. The processing device 150 employs one candidate among the multiple candidates; and sets a virtual path between the employed point and the display position of the virtual object (step S26). The candidate that does not contact the surface and has the shortest distance to the display position of the virtual object is employed as a via-position. For example, as shown in FIG. 16B, the candidate c4 is selected and employed as a via-point p2. As shown in FIG. 17A, the processing device 150 sets a virtual path R2 from the position p2 toward the display position P3.

Figure 17B:
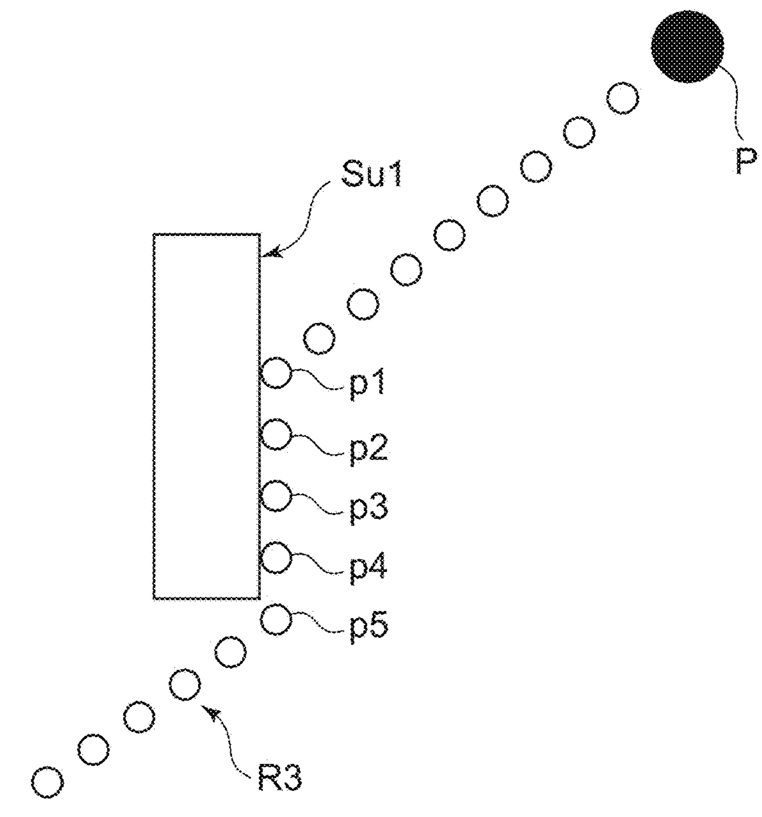

After the virtual path is set, step S23 is re-performed. According to the illustrated example, the surface Su1 still is present on the virtual path R2. Therefore, steps S24 to 26 are re-performed. By repeating steps S24 to 26, positions p2 to p5 are calculated as shown in FIG. 17B. A virtual path R3 from the position p5 to the display position P3 does not contact the surface Su1. Therefore, in step S23 after setting the virtual path R3, it is determined that a surface is not present on the virtual path.

When it is determined that a surface is not present on the virtual path, the processing device 150 substitutes "s(k)" into P, and substitutes "0" into k (step S31). The processing device 150 determines whether or not there is a detoured virtual path from the position P=s(k) to the display position of the virtual object (step S32). It is determined that there is a detoured virtual path when steps S24 to S26 are performed one or more times. When it is determined that there is a detoured virtual path, the processing device 150 searches for the point used to set the virtual path in the directly-previous step S26 (step S33). In the example shown in FIG. 17B, the position p5 is found by the search.

Figure 18A:
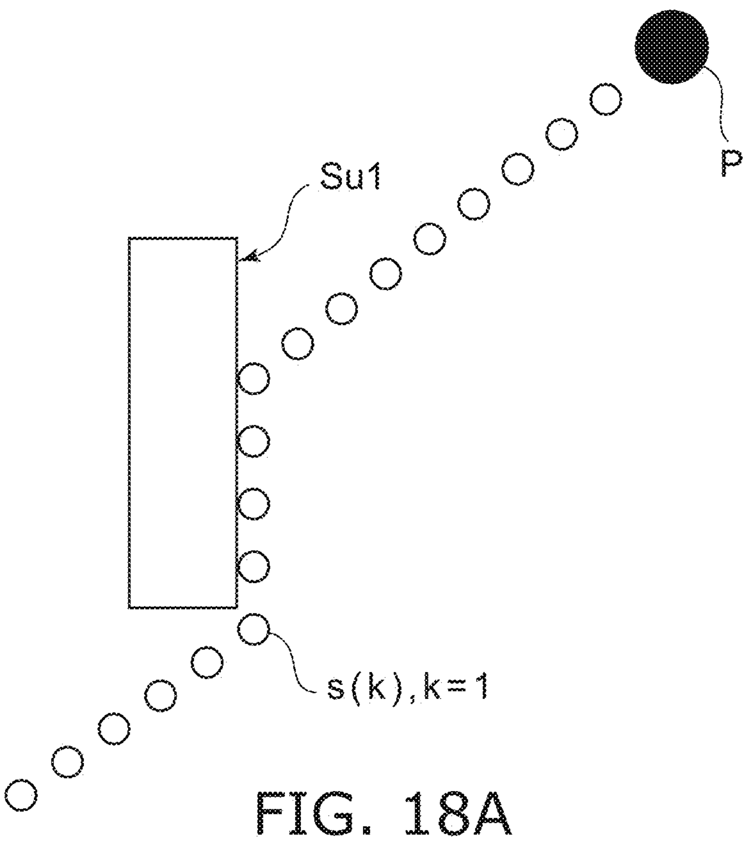
FIGS. 18A and 18B are schematic views for describing the calculation method of the path.
Figure 18B:
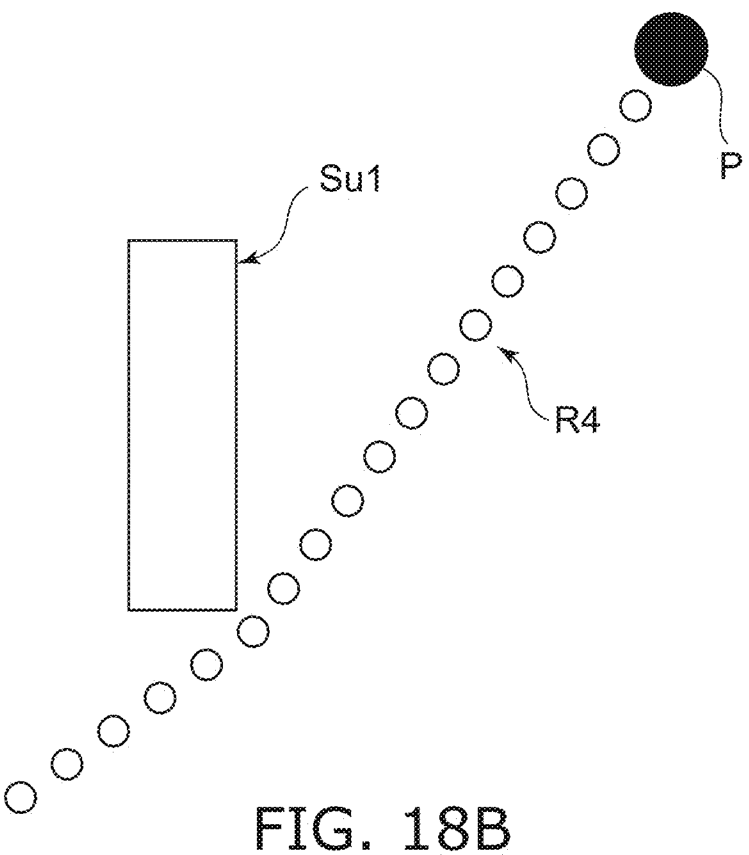

The processing device 150 acquires the position that is found as s(k+1) (step S34). The processing device 150 resets a virtual path that connects the position P=s(k) and the position s(k+1) that is found with a straight line (step S35). The processing device 150 substitutes k+1 into k (step S36). For example, as shown in FIG. 18A, the position p5 is acquired as the position s(k), with k=1. As shown in FIG. 18B, a virtual path R4 is set from the position P to the position p5. Subsequently, step S32 is re-performed by using P=s(1) as a reference. The calculation ends when it is determined in step S32 that there is no detoured path.

The shortest path from the display position of the guide to the display position of the virtual object is calculated by the path search. The guide is displayed to indicate directions along the path. As a result, the shortest path to reach the virtual object while avoiding objects in real space can be presented to the wearer of the MR device 100.

The search of the path shown in FIG. 14 is repeatedly performed at a prescribed interval. As a result, the direction that is indicated by the guide also is updated according to the movement of the wearer. When unregistered surface information is obtained after moving the MR device 100, the surface information is used to calculate the path.

Figure 19:
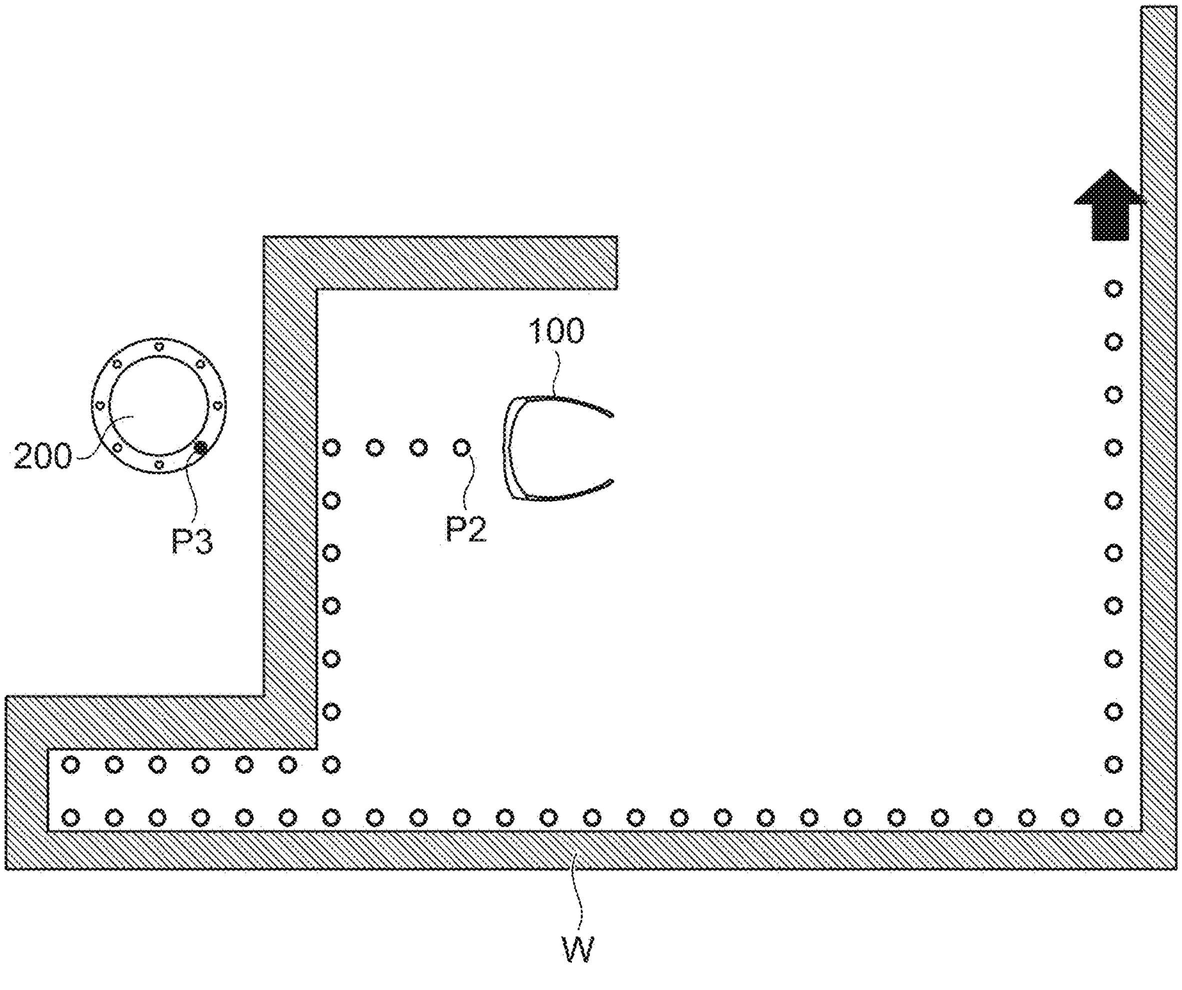
FIG. 19 is a schematic view for describing another calculation method of the path.
Figure 20:
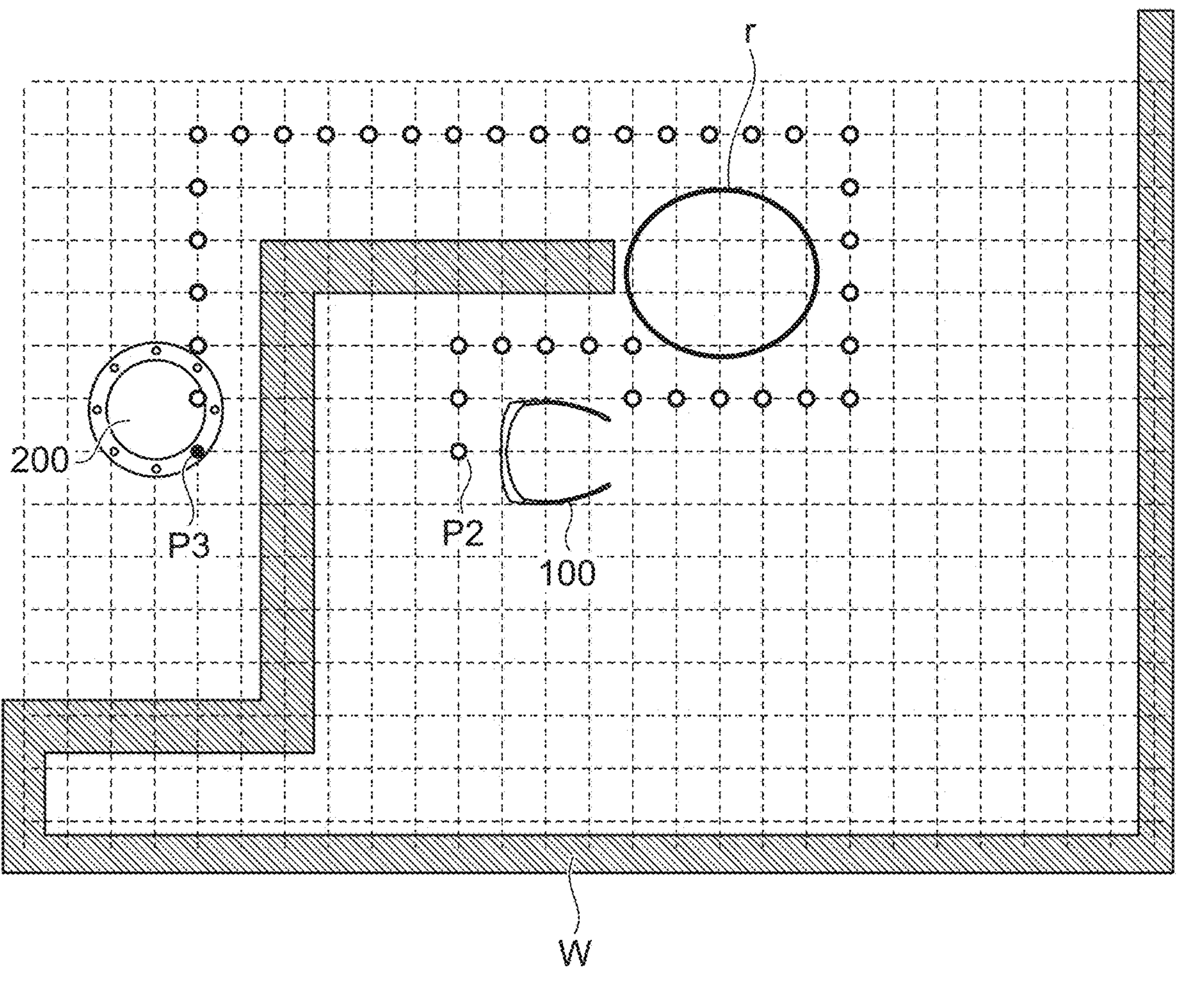
FIG. 20 is a schematic view for describing the other calculation method of the path.

FIGS. 19 and 20 are schematic views for describing another calculation method of the path.

When the structure of the article 200 or the wearer is complex, there is a possibility that the path may not be found by the calculation method described above. For example, when the wearer is surrounded with a wall W, etc., as shown in FIG. 19, the path may be searched as illustrated by a round-dotted line. In such a case, the path from the display position P2 of the guide to the display position P3 of the virtual object that is calculated is not the shortest.

In such a case, the processing device 150 may use an algorithm such as Dijkstra's algorithm, the Laplace potential method, etc., to search for the path. Dijkstra's algorithm is an algorithm that searches for the shortest path between two points, and requires a low calculation amount. The Laplace potential method also is an algorithm that searches for a movement path, and enables the generation of a smooth path. Specifically, as shown in FIG. 20, the processing device 150 sets three-dimensional path candidates in a space including the display position P2 of the guide and the display position P3 of the virtual object. For example, a virtual grid is set along two mutually-orthogonal horizontal directions and a vertical direction; and the intersections of the grid are used as candidates of the path. The processing device 150 calculates the path from the display position P2 to the display position P3 by using Dijkstra's algorithm or the Laplace potential method. For example, when Dijkstra's algorithm is used, the path is set along the intersections of the grid, and as a result, the path illustrated by the round-dotted line of FIG. 20 is found.

As shown in FIG. 20, an off-limits region r may be set inside the space. In such a case, the processing device 150 searches for a path from the display position P2 to the display position P3 that avoids the region r.

When the path is calculated using Dijkstra's algorithm or the Laplace potential method, simple two-dimensional path candidates may be set in the space. In such a case, a virtual grid is set along two mutually-orthogonal horizontal directions; and the intersections of the grid are used as candidates of the path.

The necessary calculation amount of the calculation method of the path shown in FIG. 14 can be less than that of a calculation method using Dijkstra's algorithm or the Laplace potential method. Accordingly, the calculation method shown in FIG. 14 can be repeatedly performed at a shorter interval. As a result, the display of the guide can be updated according to the movement of the MR device 100 at a shorter interval. On the other hand, as shown in FIGS. 19 and 20, there is a possibility that a calculation method that uses Dijkstra's algorithm or the Laplace potential method may obtain a shorter and more accurate path than the calculation method shown in FIG. 14. The calculation method that is used is appropriately selected according to the performance of the processing device 150, the environment in the surrounding area of the wearer, etc.

An additional object for more appropriately displaying the direction of the guide may be set. The additional object functions as a virtual surface. In other words, when the additional object is present between the guide and the virtual object, the processing device 150 uses the guide to indicate a direction in which the additional object is not present.

Figure 21A:
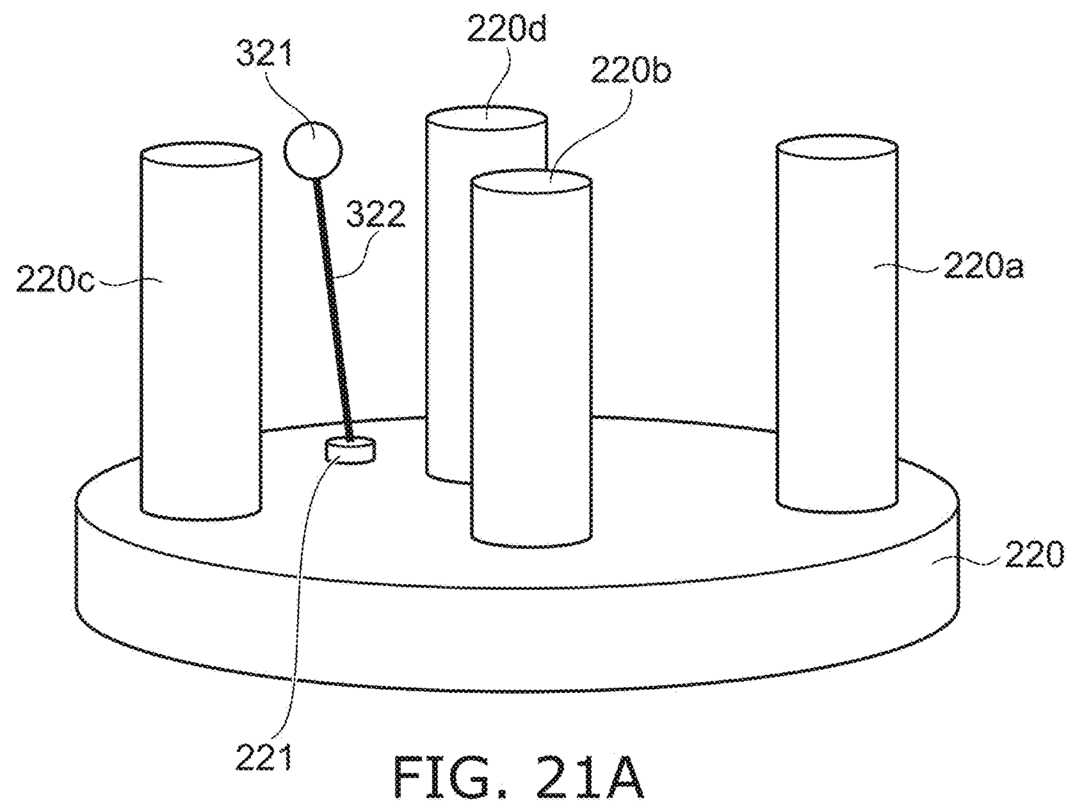
FIGS. 21A and 21B are schematic views showing an output example of the mixed reality device according to the embodiment.
Figure 21B:
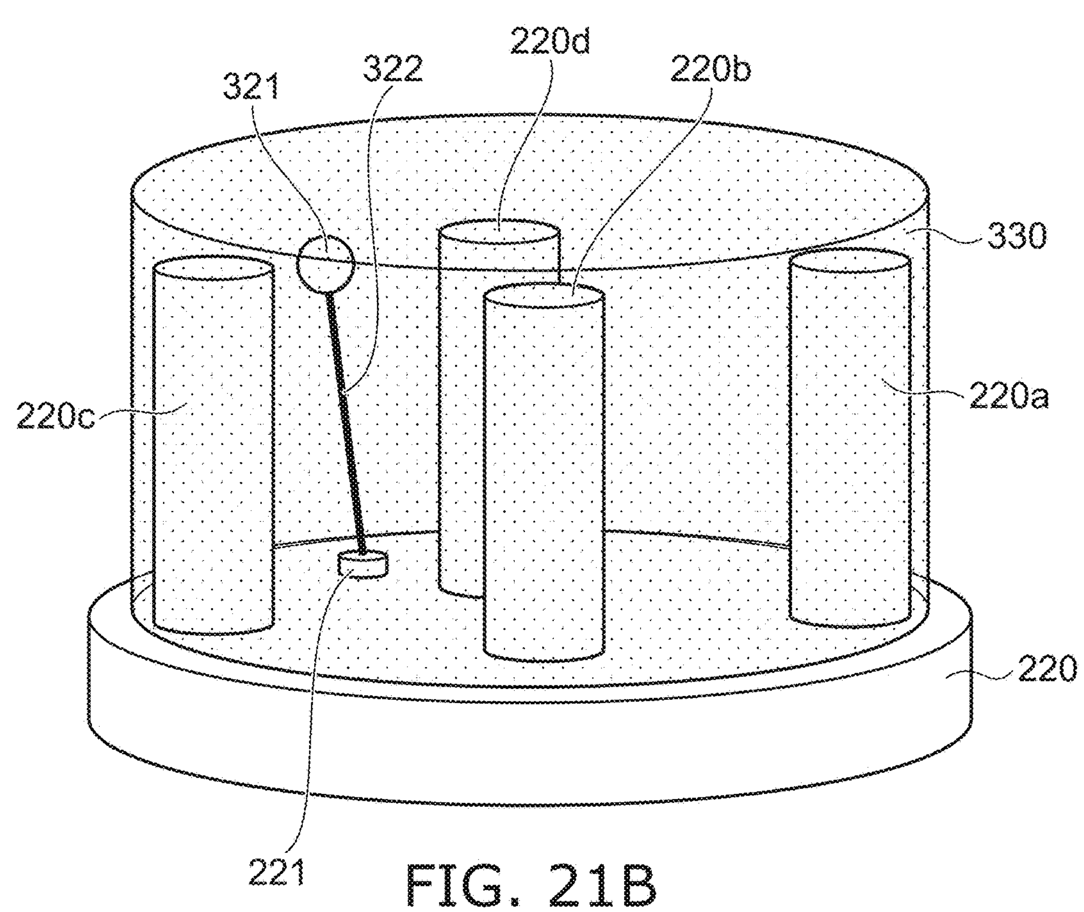

FIGS. 21A and 21B are schematic views showing an output example of the mixed reality device according to the embodiment.

An article 220 shown in FIG. 21A includes a fastening location 221. The article 220 includes cylindrical members 220*a* to 220*d* extending in the vertical direction. Virtual objects 321 and 322 are displayed at the fastening location 221. The members 220*a* to 220*d* are separated from each other. In such a case, the space between the members 220*a* to 220*d* is treated as a movable region. Actually, there is a possibility that a virtual path may be set in the space even though movement through the space between the members 220*a* to 220*d* is not possible.

For this problem, an additional object 330 is registered as shown in FIG. 21B. The additional object 330 is set around the members 220*a* to 220*d*. The processing device 150 adds the surface information of the additional object 330 to the surface information of the object obtained by spatial mapping. As a result, the path is calculated to avoid the additional object 330.

The processing device 150 may display the additional object 330, and may not display the additional object 330. By displaying the additional object 330, the wearer can ascertain that the displayed region is impassible. The processing device 150 may emit an alert when the MR device 100 contacts the additional object 330. As the alert, a message may be displayed, or a sound or light may be output. As a result, the wearer can be notified that the region is impassible.

Figure 22:
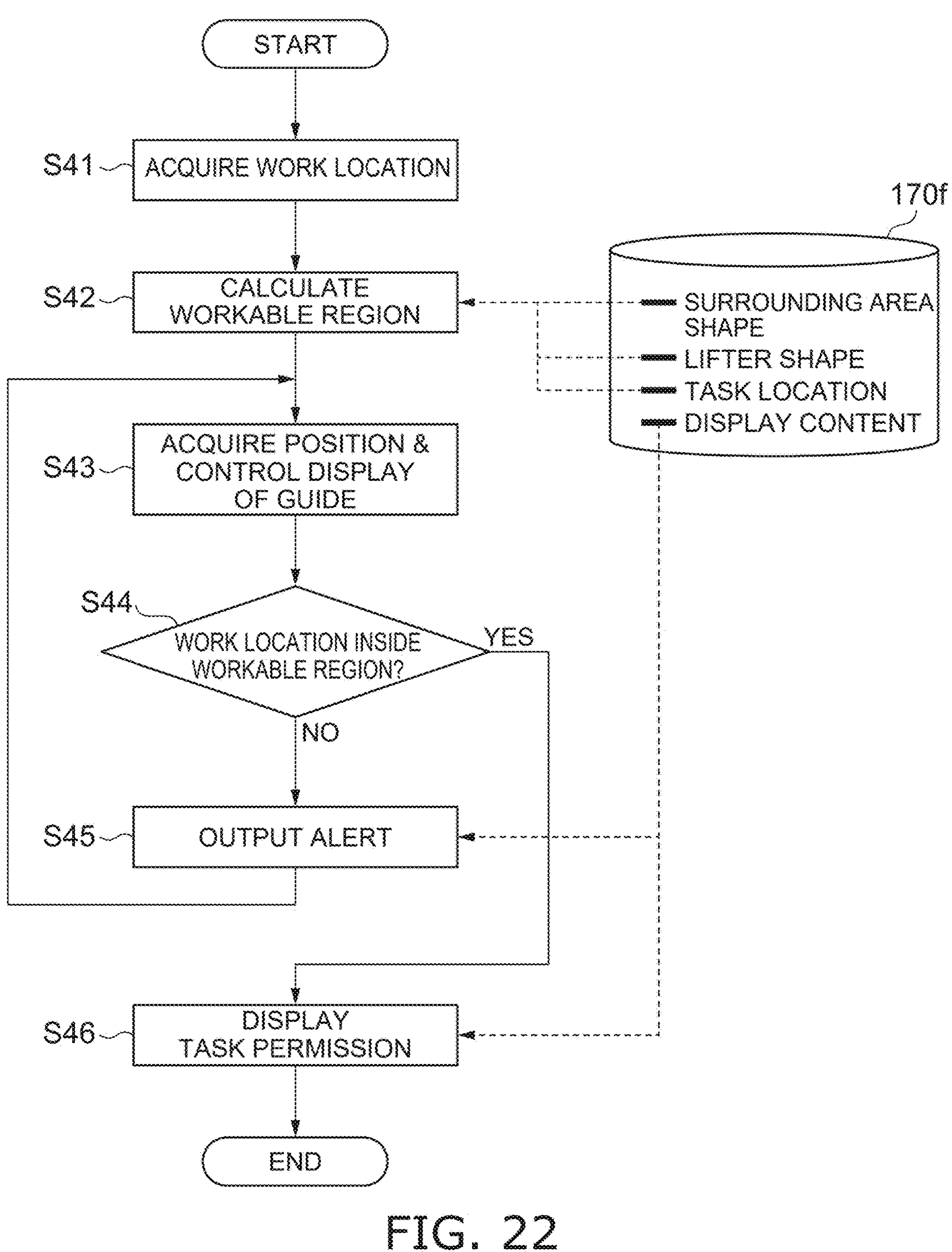
FIG. 22 is a flowchart showing processing according to the mixed reality device according to the embodiment.
Figure 23:
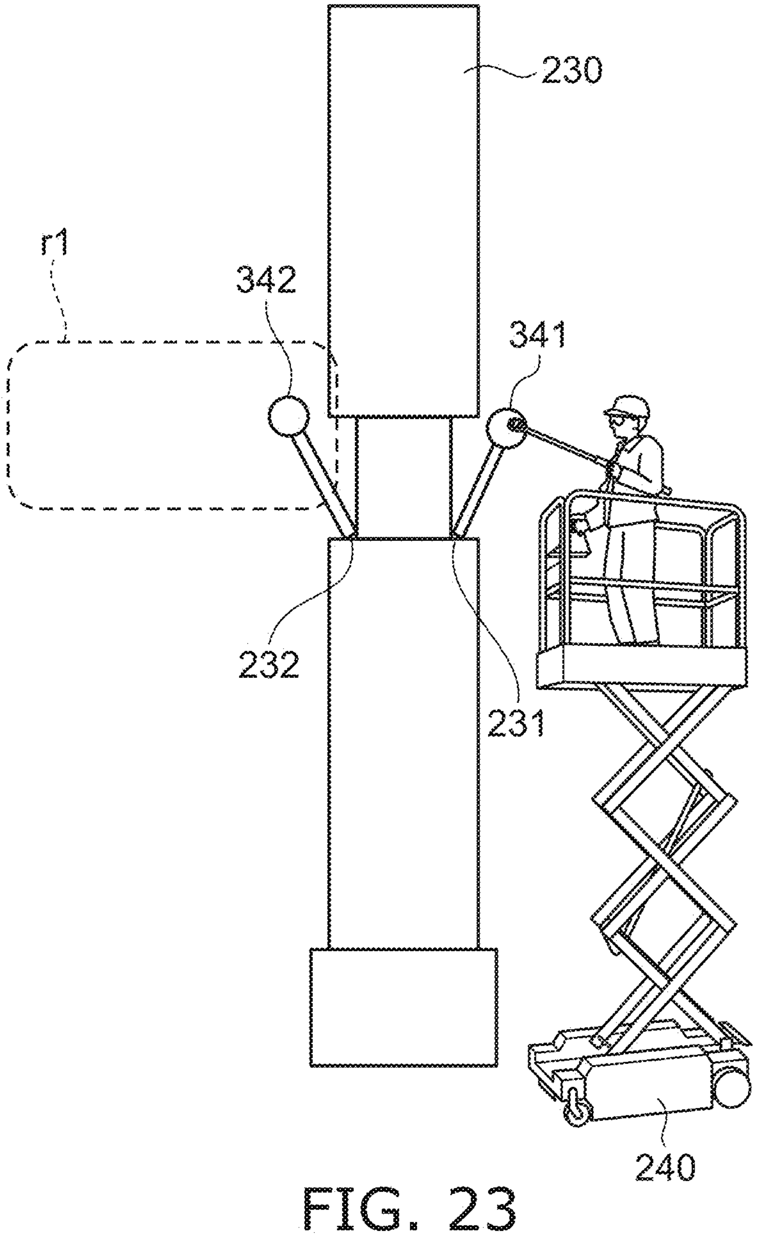
FIG. 23 is a schematic view for describing the processing of the flowchart shown in FIG. 22.
Figure 24A:
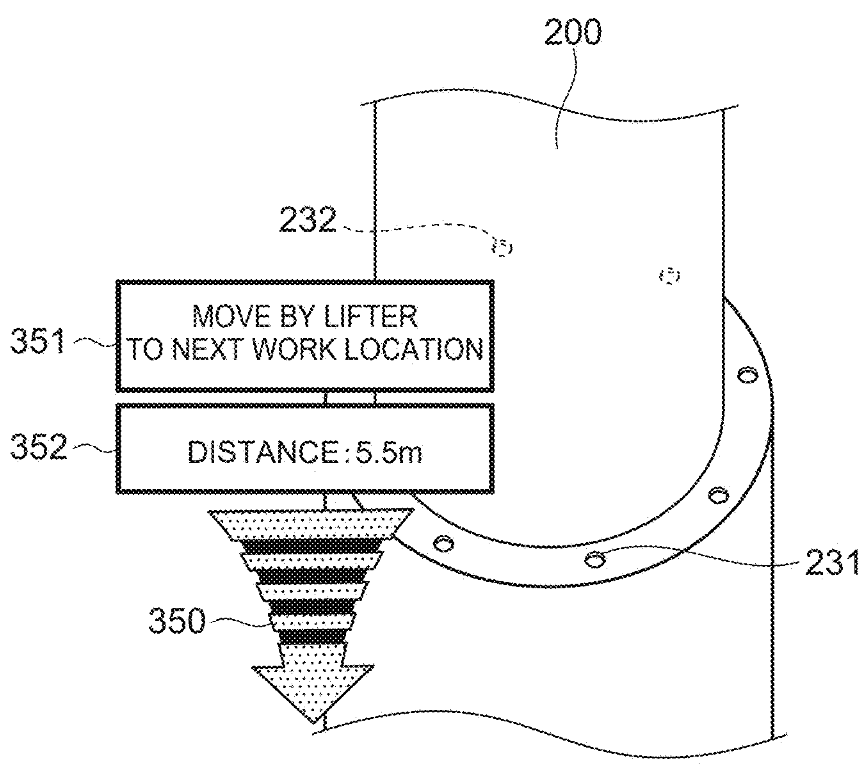
FIGS. 24A and 24B are schematic views showing output examples of the mixed reality device according to the embodiment.
Figure 24B:
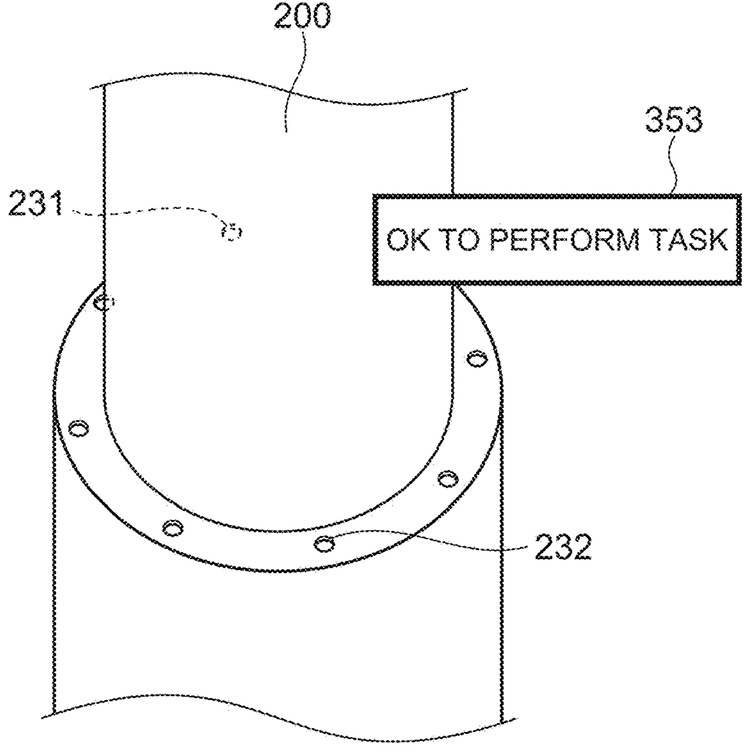

FIG. 22 is a flowchart showing processing according to the mixed reality device according to the embodiment. FIG. 23 is a schematic view for describing the processing of the flowchart shown in FIG. 22. FIGS. 24A and 24B are schematic views showing output examples of the mixed reality device according to the embodiment.

The MR device 100 may perform the processing of the flowchart shown in FIG. 22. For example, the processing shown in FIG. 22 is performed after step S3 shown in FIG. 10 in parallel with the processing of steps S4 and S5.

First, the processing device 150 acquires data of locations at which tasks will be performed (step S41). For example, the data of the locations at which the tasks will be performed is acquired from the fastening location master data 170*d* shown in FIG. 10. Based on the work location, the processing device 150 calculates a workable region in which the task is permitted (step S42). For example, a range of a preset distance in a preset direction as referenced to the work location is calculated as the workable region.

The processing device 150 acquires the position of the MR device 100 and controls the display of the guide (step S43). The processing shown in FIG. 11 is performed in step S43. For example, when the display position of the virtual object displayed at the next work location is outside the visible region, the path from the position of the MR device 100 to the display position of the virtual object is searched. A guide that indicates the path is displayed.

The processing device 150 determines whether or not the work location is inside the workable region (step S44). When it is determined that the work location is not inside the workable region, the processing device 150 outputs an alert (step S45). As the alert, a message may be displayed, or a sound or light may be output. After outputting the alert, step S43 is re-performed.

When it is determined that the work location is inside the workable region in step S44, the processing device 150 displays that the task is permitted (step S45).

For example, as shown in FIG. 23, the task is performed on an article 230. The article 230 includes fastening locations 231 and 232. The worker uses a lifter 240 to sequentially tighten screws at the fastening locations 231 and 232. A virtual object 341 is displayed at the fastening location 231; and a virtual object 342 is displayed at the fastening location 232.

After the worker tightens the screw at the fastening location 231, the processing device 150 acquires the position of the fastening location 232. The processing device 150 calculates a workable region r1 referenced to the position of the fastening location 232. According to the illustrated example, the position of the MR device 100 is not included in the workable region r1. Therefore, the processing device 150 emits an alert.

When the task shown in FIG. 23 is performed, for example, working environment master data 170*f* shown in FIG. 22 is referenced. The working environment master data 170*f* stores the shape of the surrounding area of the article 230, the shape of the lifter 240, the location at which the task is to be performed, and the display content of the guide, the alert, etc. The processing device 150 calculates the workable region r1 by using the data registered in the working environment master data 170*f*. The processing device 150 also displays alerts and permission of the task by using the data registered in the working environment master data 170*f*.

As an example, after the task at the fastening location 231 is finished, an alert 351 and a message 352 are displayed as shown in FIG. 24A. The alert 351 instructs the worker to move the lifter 240 to perform the task at the fastening location 232. The message 352 shows the distance to move in the lifter 240. The guide 350 indicates the direction to move in the lifter.

As shown in FIG. 24B, a message 353 is displayed when the wearer of the MR device 100 moves proximate to the fastening location 232. The message 353 indicates that the task can be performed.

Herein, examples are mainly described in which the embodiment of the invention is applied to a task of tightening a screw. The embodiment of the invention is applicable to a task of loosening a screw. Even when loosening a screw, the screw is turned by using the tool as shown in FIG. 5. In such a case as well, the task can be efficiently performed by displaying the virtual object.

The embodiment of the invention is applicable to a task other than turning a screw. For example, the task may be the assembly of an article, the dismantling of an article, the transport of an article, etc. In any of the tasks, the task can be efficiently performed because the virtual object is displayed. When the article on which the task is to be performed is moved, the convenience of the MR device can be improved by changing the display position of the virtual object according to the movement amount or by stopping the estimation of the location at which the task is to be performed.

Figure 25:
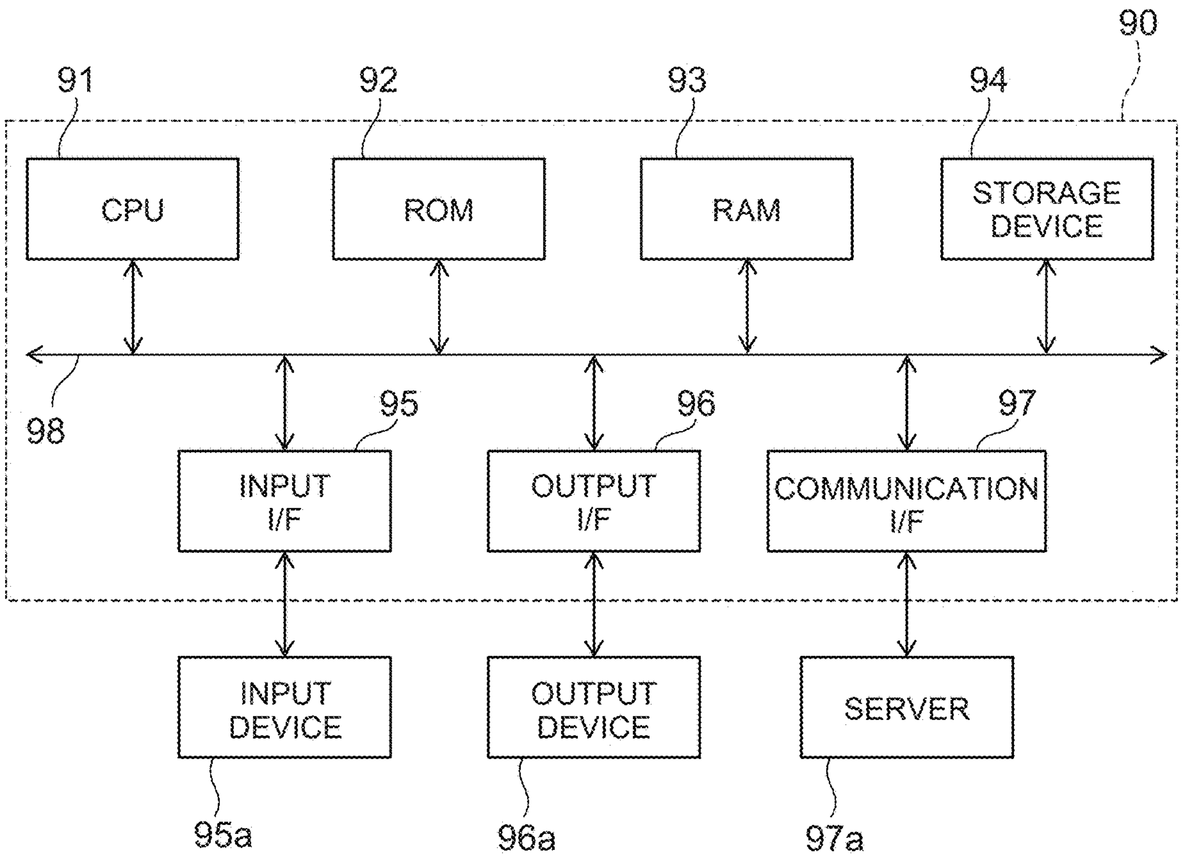
FIG. 25 is a schematic view showing a hardware configuration.

FIG. 25 is a schematic view showing a hardware configuration.

For example, a computer 90 shown in FIG. 25 is used as each of the processing devices 150. The computer 90 includes a CPU 91, ROM 92, RAM 93, a storage device 94, an input interface 95, an output interface 96, and a communication interface 97.

The ROM 92 stores programs controlling operations of the computer 90. The ROM 92 stores programs necessary for causing the computer 90 to realize the processing described above. The RAM 93 functions as a memory region into which the programs stored in the ROM 92 are loaded.

The CPU 91 includes a processing circuit. The CPU 91 uses the RAM 93 as work memory and executes the programs stored in at least one of the ROM 92 or the storage device 94. When executing the programs, the CPU 91 executes various processing by controlling configurations via a system bus 98.

The storage device 94 stores data necessary for executing the programs and/or data obtained by executing the programs. The storage device 94 includes a solid state drive (SSD), etc.

The input interface (I/F) 95 can connect the computer 90 with an input device. The CPU 91 can read various data from an input device via the input I/F 95.

The output interface (I/F) 96 can connect the computer 90 and an output device. The CPU 91 can transmit data to the output device via the output I/F 96 and can cause the output device to output information.

The communication interface (I/F) 97 can connect the computer 90 and a device outside the computer 90. For example, the communication I/F 97 is connected by Bluetooth (registered trademark) communication between the digital tool and the computer 90.

The data processing performed by each of the processing devices 150 may be performed by only one computer 90. A portion of the data processing may be performed by another computer, server, etc., via the communication I/F 97.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD+R, DVD+RW, etc.), semiconductor memory, or another non-transitory computer-readable storage medium.

For example, the information that is recorded in the recording medium can be read by a computer (or an embedded system). The recording format (the storage format) of the recording medium is arbitrary. For example, the computer reads a program from the recording medium and causes a CPU to execute the instructions recited in the program based on the program. In the computer, the acquisition (or the reading) of the program may be performed via a network.

The embodiment of the invention includes the following features.

Feature 1

A mixed reality device, configured to:

display a virtual space to overlap a real space;

set an origin of the virtual space by using a prescribed object imaged in the real space;

acquire a display position of a virtual object in a three-dimensional coordinate system based on the origin;

determine whether or not the display position is present inside a visible region set in front of the mixed reality device; and display a guide indicating a direction of the display position when the display position is not present inside the visible region.

Feature 2

The mixed reality device according to feature 1, in which the mixed reality device is configured to:

recognize a surface of an object in a surrounding area of the mixed reality device; and set the visible region to be between the mixed reality device and the recognized surface.

Feature 3

The mixed reality device according to feature 2, in which when the surface is present between the guide and the display position, the guide indicates a direction in which the surface is not present.

Feature 4

The mixed reality device according to feature 2 or 3, in which the mixed reality device is configured to read an additional object set to a prescribed position in the virtual space, and when the additional object is present between the guide and the display position, the guide indicates a direction in which the additional object is not present.

Feature 5

The mixed reality device according to any one of features 2 to 4, in which the mixed reality device is configured to search for a path from the guide to the display position when the surface is present between the guide and the display position, and the guide indicates a direction along the searched path.

Feature 6

The mixed reality device according to any one of features 1 to 5, in which the virtual object is displayed to correspond to a fastening location at which a screw is turned.

Feature 7

The mixed reality device according to feature 6, in which the mixed reality device estimates that a task is being performed on the fastening location corresponding to the virtual object when a hand or a tool contacts the virtual object.

Feature 8

The mixed reality device according to feature 7, in which when receiving data from the tool after the hand or the tool contacts the virtual object, the mixed reality device associates and stores data of the corresponding fastening location and the data received from the tool.

Feature 9

A processing method, the processing method being of a mixed reality device configured to display a virtual space to overlap a real space, the processing method including:

causing the mixed reality device to set an origin of the virtual space by using a prescribed object imaged in the real space;

causing the mixed reality device to acquire a display position of a virtual object in a three-dimensional coordinate system based on the origin, causing the mixed reality device to determine whether or not the display position is present inside a visible region set in front of the mixed reality device; and causing the mixed reality device to display a guide indicating a direction of the display position when the display position is not present inside the visible region.

Feature 10

A program, when executed by the mixed reality device, causing the mixed reality device to perform the processing method according to feature 9.

Feature 11

A storage medium configured to store the program according to feature 10.

According to embodiments above, a mixed reality device that has better convenience is provided. Also, a processing method, a program, and a storage medium are provided in which the convenience of the mixed reality device can be further improved.

In the specification, "or" indicates that "at least one or more" of items enumerated in the sentence can be adopted.

Although some embodiments of the invention have been described above, these embodiments have been presented by way of example and are not intended to limit the scope of the invention. These novel embodiments can be implemented in a variety of other forms, and various omissions, substitutions, changes, and the like can be made without departing from the gist of the invention. Such embodiments or their modifications fall within the scope of the invention as defined in the claims and their equivalents as well as within the scope and gist of the invention. The above-described embodiments can be implemented in combination with each other.

What is claimed is:

1. A mixed reality device, comprising:

a display;

an imaging device; and processing circuitry configured to:

display a virtual space to overlap a real space;

when the imaging device captures a prescribed object in a real space, recognize the prescribed object;

set an origin of the virtual space and an orientation of a three-dimensional coordinate system that is fixed to the prescribed object based on a pose of the recognized prescribed object;

acquire a display position of a virtual object that is pre-registered as coordinates in the three-dimensional coordinate system;

calculate, using the pre-registered coordinates based on the origin and the orientation, a display position at which the virtual object is to be displayed;

determine whether or not the display position is present inside a visible region set in front of the mixed reality device; and display a guide indicating a direction of the display position when the display position is not present inside the visible region.

2. The mixed reality device according to claim 1, wherein the mixed reality device is configured to:

recognize a surface of an object in a surrounding area of the mixed reality device; and set the visible region to be between the mixed reality device and the recognized surface.

3. The mixed reality device according to claim 2, wherein when the surface is present between the guide and the display position, the guide indicates a direction in which the surface is not present.

4. The mixed reality device according to claim 2, wherein the mixed reality device is configured to read an additional object set to a prescribed position in the virtual space, and when the additional object is present between the guide and the display position, the guide indicates a direction in which the additional object is not present.

5. The mixed reality device according to claim 2, wherein the mixed reality device is configured to search for a path from the guide to the display position when the surface is present between the guide and the display position, and the guide indicates a direction along the searched path.

6. The mixed reality device according to claim 1, wherein the virtual object is displayed to correspond to a fastening location at which a screw is turned.

7. The mixed reality device according to claim 6, wherein the mixed reality device estimates that a task is being performed on the fastening location corresponding to the virtual object when a hand or a tool contacts the virtual object.

8. The mixed reality device according to claim 7, wherein when receiving data from the tool after the hand or the tool contacts the virtual object, the mixed reality device associates and stores data of the corresponding fastening location and the data received from the tool.

9. The mixed reality device according to claim 1, wherein the guide is displayed at a guide display position in front of the mixed reality device, and when the display position is outside the visible region, the processing circuitry is configured to calculate a path from the guide display position to the display position while avoiding registered surface information and a prohibited region, and control the guide to indicate a direction along the shortest path.

10. The mixed reality device according to claim 9, wherein the path is calculated by executing at least one of a Dijkstra algorithm and a Laplace potential method.

11. The device of claim 1, further comprising a depth camera, wherein the processing circuitry is configured to:

store surface information obtained by the mixed reality device as registered surface information in an environment map database, calculate a path to the display position using the registered surface information stored in the environment map database, and when unregistered surface information is obtained during operation, register the unregistered surface information in the environment map database and recalculate the path using the updated registered surface information.

12. A processing method executed by a mixed reality device including a display and an imaging device, the processing method comprising:

displaying a virtual space to overlap a real space;

when the imaging device captures a prescribed object in a real space, recognizing the prescribed object;

setting an origin of the virtual space and an orientation of a three-dimensional coordinate system that is fixed to the prescribed object based on a pose of the recognized prescribed object;

acquiring a display position of a virtual object that is pre-registered as coordinates in the three-dimensional coordinate system;

calculating, using the pre-registered coordinates based on the origin and the orientation, a display position at which the virtual object is to be displayed;

determining whether or not the display position is present inside a visible region set in front of the mixed reality device; and displaying a guide indicating a direction of the display position when the display position is not present inside the visible region.

13. A non-transitory computer-readable storage medium configured to store a program, the program, when executed by the mixed reality device, causing the mixed reality device to perform the processing method according to claim 12.

* * * * *